US012017260B2

(12) United States Patent
Franzino et al.

(10) Patent No.: US 12,017,260 B2
(45) Date of Patent: Jun. 25, 2024

(54) SYSTEMS AND METHODS FOR BELT-FED TUBE CLEANING

(71) Applicant: Crossford International, LLC, Stamford, CT (US)

(72) Inventors: Joseph J. Franzino, Redding, CT (US); Stephen S. Bitondo, Ellenville, NY (US); Jon-Anthony C. Maselli, Stamford, CT (US)

(73) Assignee: Crossford International, LLC, Stamford, CT (US)

( * ) Notice: Subject to any disclaimer, the term of this patent is extended or adjusted under 35 U.S.C. 154(b) by 655 days.

(21) Appl. No.: 17/222,839

(22) Filed: Apr. 5, 2021

(65) Prior Publication Data

US 2021/0220880 A1 Jul. 22, 2021

Related U.S. Application Data

(63) Continuation of application No. PCT/US2019/055269, filed on Oct. 8, 2019.

(60) Provisional application No. 62/742,893, filed on Oct. 8, 2018.

(51) Int. Cl.
*B08B 9/04* (2006.01)
*F16L 55/46* (2006.01)
*F28G 1/04* (2006.01)
*F28G 1/12* (2006.01)
*E21B 17/00* (2006.01)

(52) U.S. Cl.
CPC ............... *B08B 9/04* (2013.01); *F16L 55/46* (2013.01); *F28G 1/04* (2013.01); *F28G 1/12* (2013.01); *E21B 17/00* (2013.01)

(58) Field of Classification Search
CPC ............. B08B 9/04; F16L 55/46; E21B 17/00
See application file for complete search history.

(56) References Cited

U.S. PATENT DOCUMENTS

| 4,467,488 | A | | 8/1984 | Creek | |
|---|---|---|---|---|---|
| 5,103,524 | A | | 4/1992 | Vowles | |
| 5,784,745 | A | * | 7/1998 | Saxon | F28G 1/12 15/104.16 |
| 8,826,483 | B2 | * | 9/2014 | Rutkowski | G05G 5/005 242/395 |
| 9,683,356 | B1 | * | 6/2017 | Selius | E03C 1/302 |
| 2006/0283431 | A1 | | 12/2006 | Lee et al. | |

(Continued)

FOREIGN PATENT DOCUMENTS

WO WO2017/062023 4/2017

OTHER PUBLICATIONS

International Search Report for PCT/US2019/055269 dated Jan. 23, 2020; 2 pps.

(Continued)

*Primary Examiner* — Michael D Jennings
(74) *Attorney, Agent, or Firm* — Carson C.K. Fincham; Rowan Tree Law Group, PLLC

(57) ABSTRACT

Belt-fed tube cleaning systems and methods may include a tube cleaning projectile belt loaded into a pneumatic firing apparatus employing a cam-activated indexing element and projectile belt separation objects that permit or cause removal of individual tube cleaning projectiles from the tube cleaning projectile belt for semi-automatic tube cleaning operation thereof.

20 Claims, 21 Drawing Sheets

(56) References Cited

U.S. PATENT DOCUMENTS

| | | | | |
|---|---|---|---|---|
| 2010/0012152 | A1* | 1/2010 | Hansen | B08B 9/035 134/22.12 |
| 2010/0294316 | A1* | 11/2010 | Antal | B08B 9/0436 134/22.12 |
| 2011/0239386 | A1* | 10/2011 | Hodde | F16L 55/46 15/104.062 |
| 2014/0123530 | A1* | 5/2014 | Williams | B08B 9/0436 42/95 |
| 2014/0124002 | A1* | 5/2014 | Williams | A61B 1/122 134/8 |
| 2015/0313681 | A1* | 11/2015 | Eikens | A61B 1/122 15/104.05 |
| 2016/0354814 | A1* | 12/2016 | Carson | B08B 9/0436 |
| 2016/0369930 | A1* | 12/2016 | Poe | F16L 55/46 |

OTHER PUBLICATIONS

Written Opinion for PCT/US2019/055269 dated Jan. 23, 2020; 4 pps.

* cited by examiner

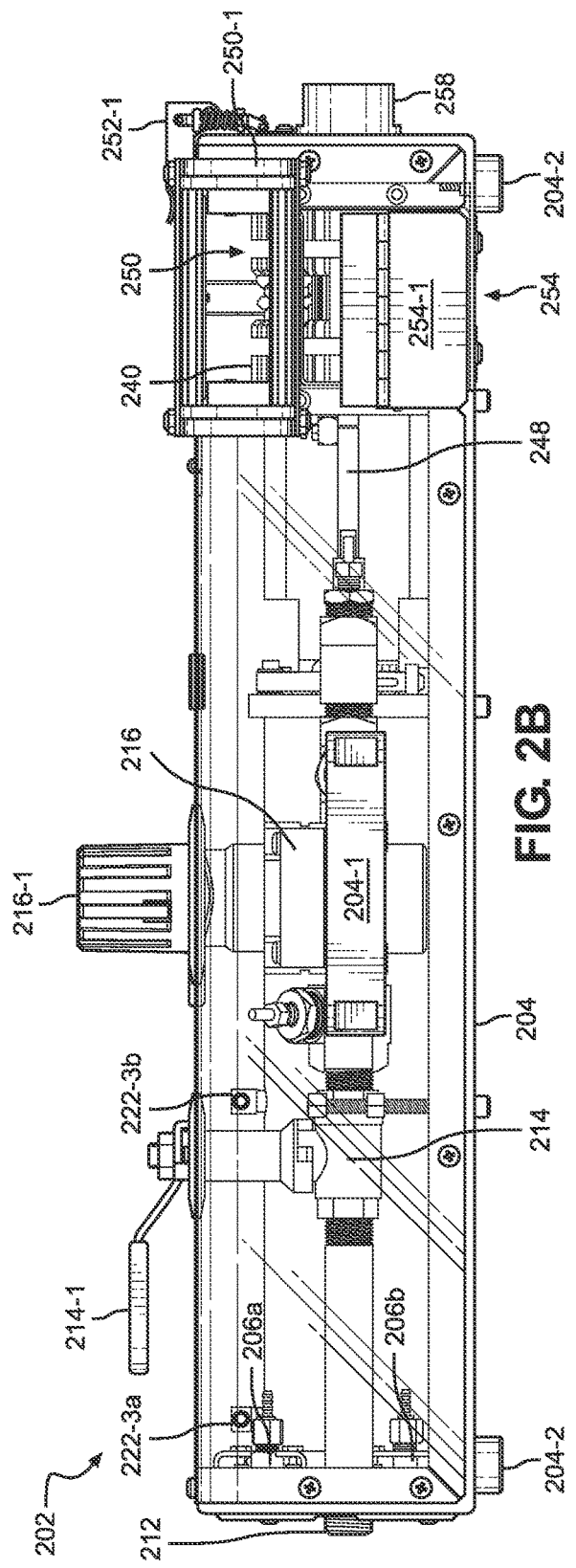
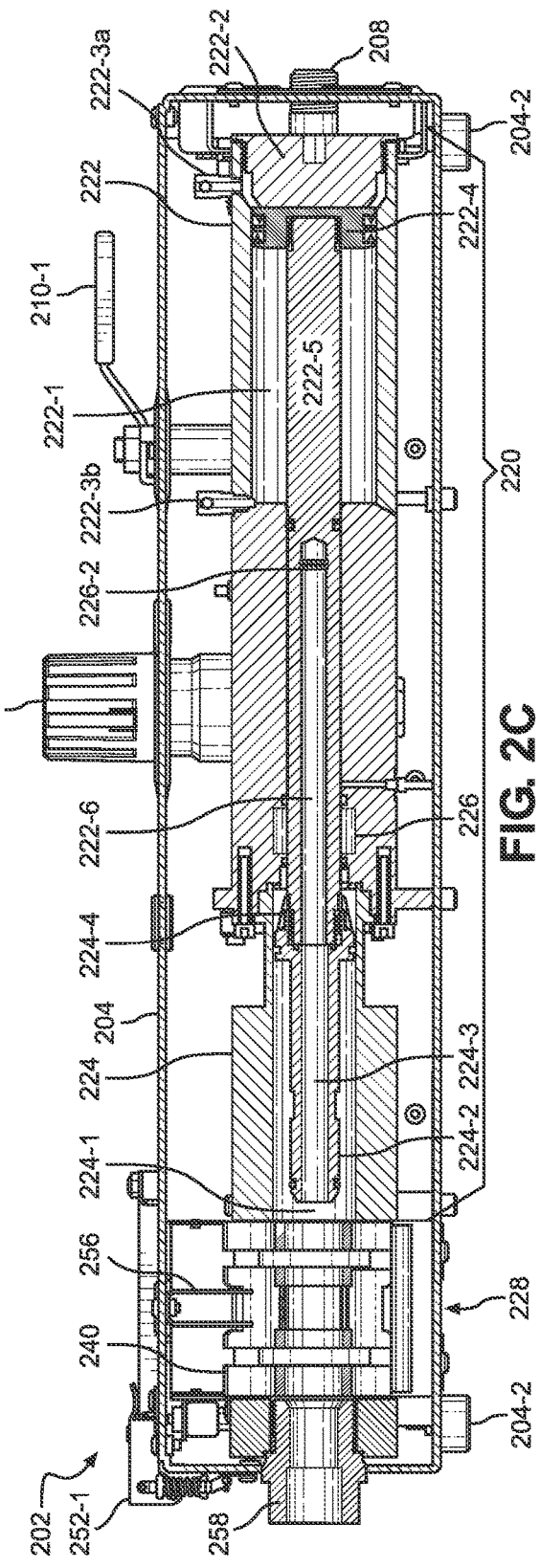
FIG. 2B
FIG. 2C

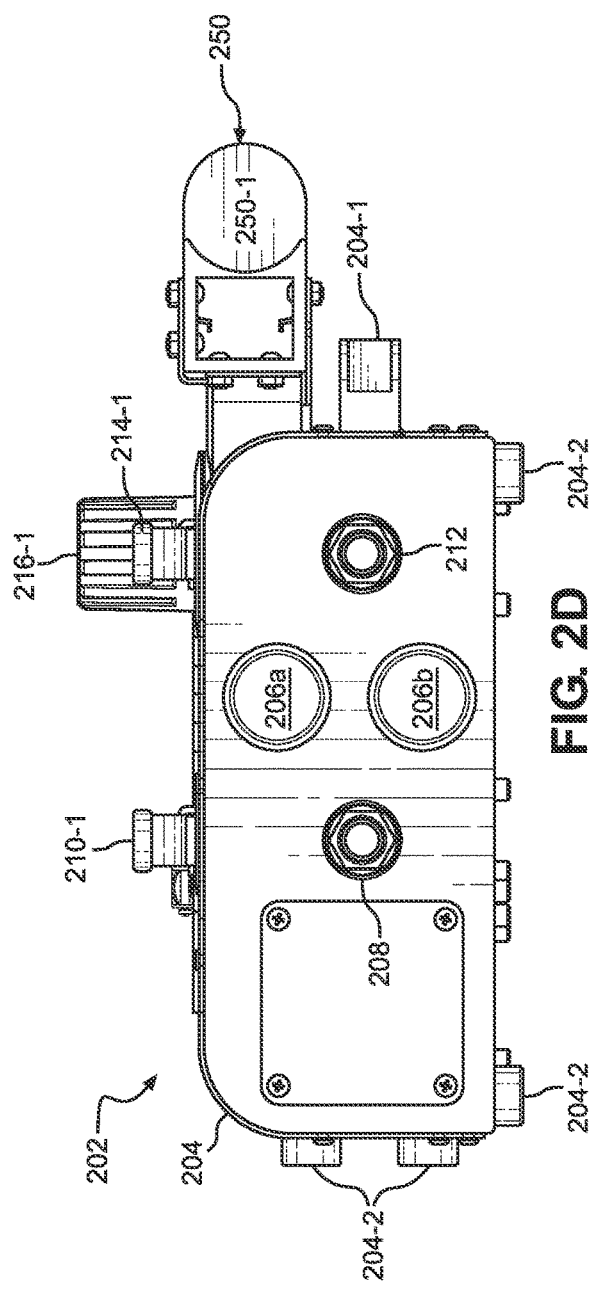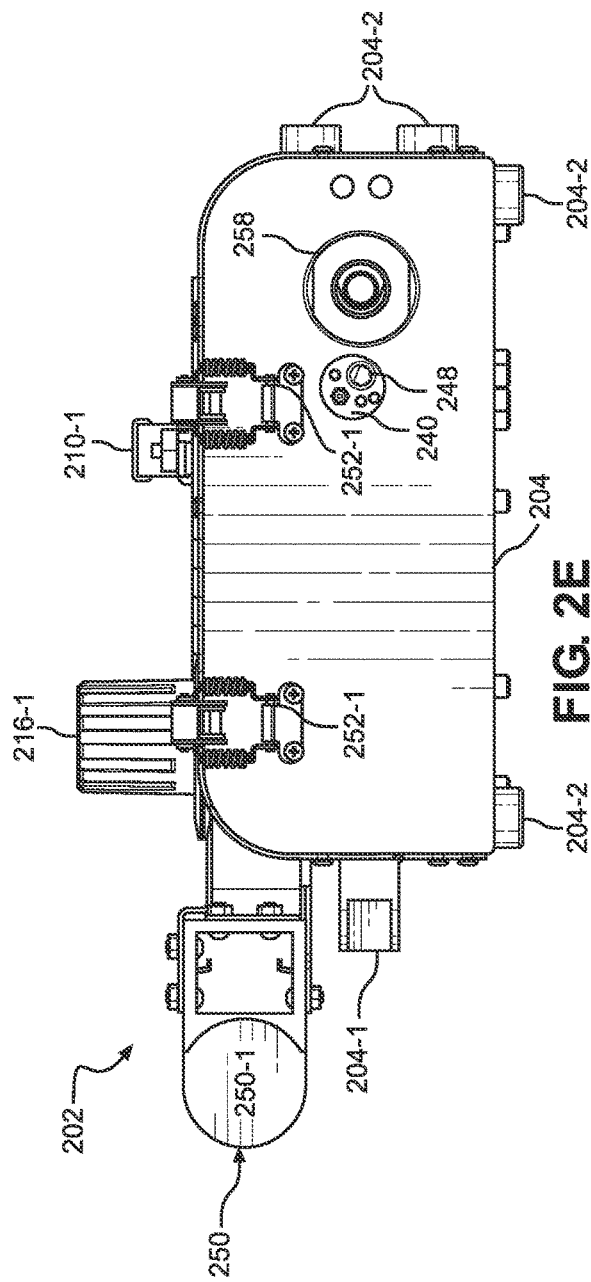

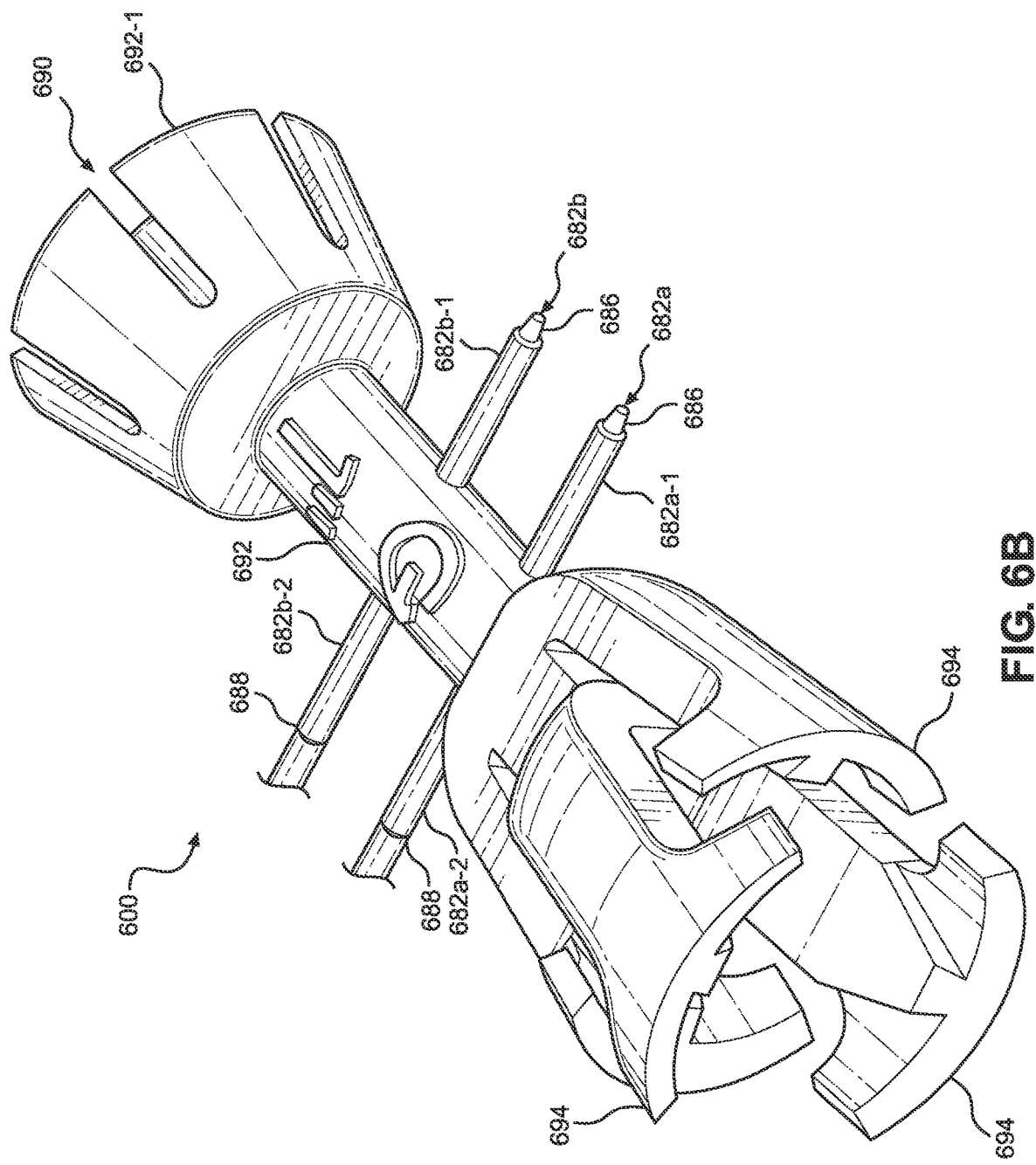

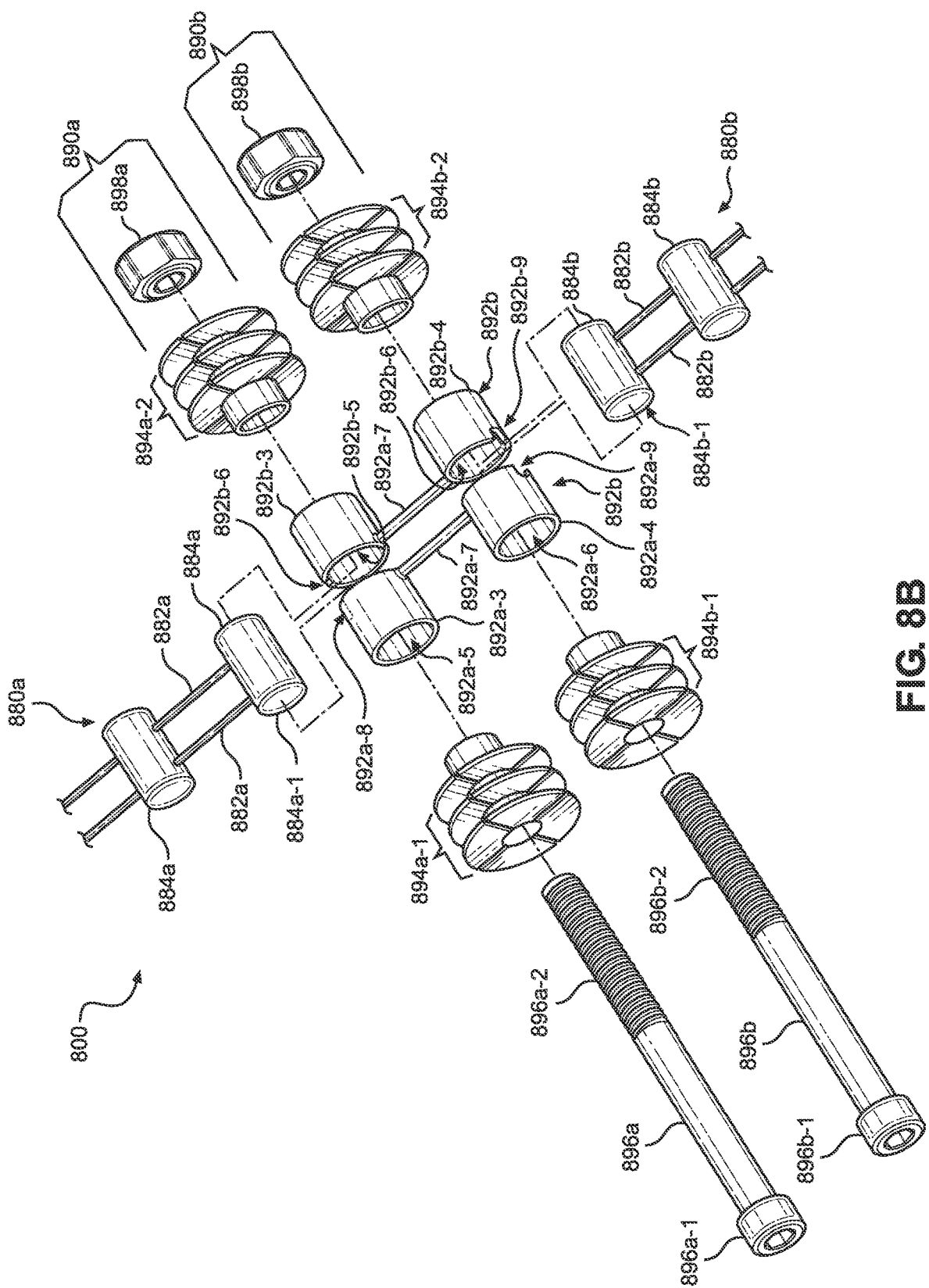

SYSTEMS AND METHODS FOR BELT-FED TUBE CLEANING

CROSS-REFERENCE TO RELATED APPLICATIONS

This application claims benefit and priority under 35 U.S.C. § 120 to, and is a Continuation of International Patent Application No. PCT/US2019/055269 filed on Oct. 8, 2019 and titled "SYSTEMS AND METHODS FOR BELT-FED TUBE CLEANING" which itself claims benefit and priority to U.S. Provisional Patent Application No. 62/742,893 filed on Oct. 8, 2018 and titled "SYSTEMS AND METHODS FOR BELT-FED TUBE CLEANING", each of which is hereby incorporated by reference herein in its entirety.

BACKGROUND

Air conditioning, industrial chilling and power plant steam condensing systems are typically configured with arrays of tubes. Boilers and other commercial or industrial equipment may also include fluid tubes to provide various heat exchange functionality. Such tubes must be serviced to maintain efficient energy use, prevent or reduce fouling and corrosion and such servicing typically involves utilization of both mechanical and fluid treatment on the interior surfaces of the tubes. The fluid treatment itself often includes application of chemical cleaners or inhibitors. In some cases, different tools may be utilized for each of the mechanical agitation, chemical application, and powered fluid cleaning or washing.

One type of tool that may be utilized to effectuate mechanical agitation of tube deposits is a projectile that includes brushes and/or scraper blades, the projectile being forcibly passed (e.g., fired or shot) through a tube being serviced. Examples of delivery mechanisms for such projectiles include the QS-300 Condenser Tube Cleaning Gun available from Goodway Technologies Corporation of Stamford, CT and/or the "LAUNCHER FOR TUBE CLEANING PROJECTILES" as described in U.S. Pat. No. 8,146,193 issued to Franzino et al. Examples of tube cleaning/scraper projectiles utilized in the tube cleaning industry are described in U.S. Pat. No. 3,939,519 issued to Muirhead and titled "CONDENSER TUBE CLEANING PLUG", U.S. Pat. No. 7,490,381 issued to Franzino and titled "TUBE SCRAPER", U.S. Pat. No. 5,305,488 issued to Lyle ("Lyle I") and titled "TUBE CLEANING TOOL", and U.S. Pat. No. 7,454,812 issued to Lyle ("Lyle II") and titled "TUBE CLEANING TOOL".

While such products provide various advantages, the task of cleaning tube arrays continues to be time consuming.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 2A, FIG. 2B, FIG. 2C, FIG. 2D, FIG. 2E, FIG. 2F, and FIG. 2G are perspective, left-side, right-side, front, back, top, and bottom cut-away and cross-sectional views of a belt-fed tube cleaning projectile firing mechanism according to some embodiments;

FIG. 6A and FIG. 6B are perspective views of a belt-fed tube cleaning projectile system according to some embodiments;

FIG. 8A and FIG. 8B are perspective views of a belt-fed tube cleaning projectile system according to some embodiments;

DETAILED DESCRIPTION

I. Introduction

Embodiments presented herein are descriptive of belt-fed tube cleaning methods and systems (and components and/or features thereof). Belt-fed tube cleaning apparatus and/or systems may comprise various components, for example, such as a cammed indexing mechanism that is operable to feed tube cleaning projectiles via a projectile feed belt into a semi-automatic firing mechanism. According to some embodiments, the semi-automatic firing mechanism and/or the indexing mechanism thereof may comprise one or more teeth, blades, and/or other separation features that are operable to sever the feed belt to permit an individual tube cleaning projectile to be removed from the belt and propelled into a tube to be cleaned. According to some embodiments, the semi-automatic firing mechanism and/or the indexing mechanism thereof may be coupled to a housing such as a box or case that is in communication with a projectile delivery mechanism such as a hand-held tube cleaning projectile gun. In some embodiments, specialized tube cleaning projectile feed belts comprising a plurality of selectively separable tube cleaning projectiles may be fed into the semi-automatic firing mechanism and launched, fired, and/or otherwise shot into a tube as part of a method for cleaning and/or maintaining an array of tubes (e.g., heat exchanger tubes, boiler tubes).

II. Belt-Fed Tube Cleaning Systems

Figure 1:
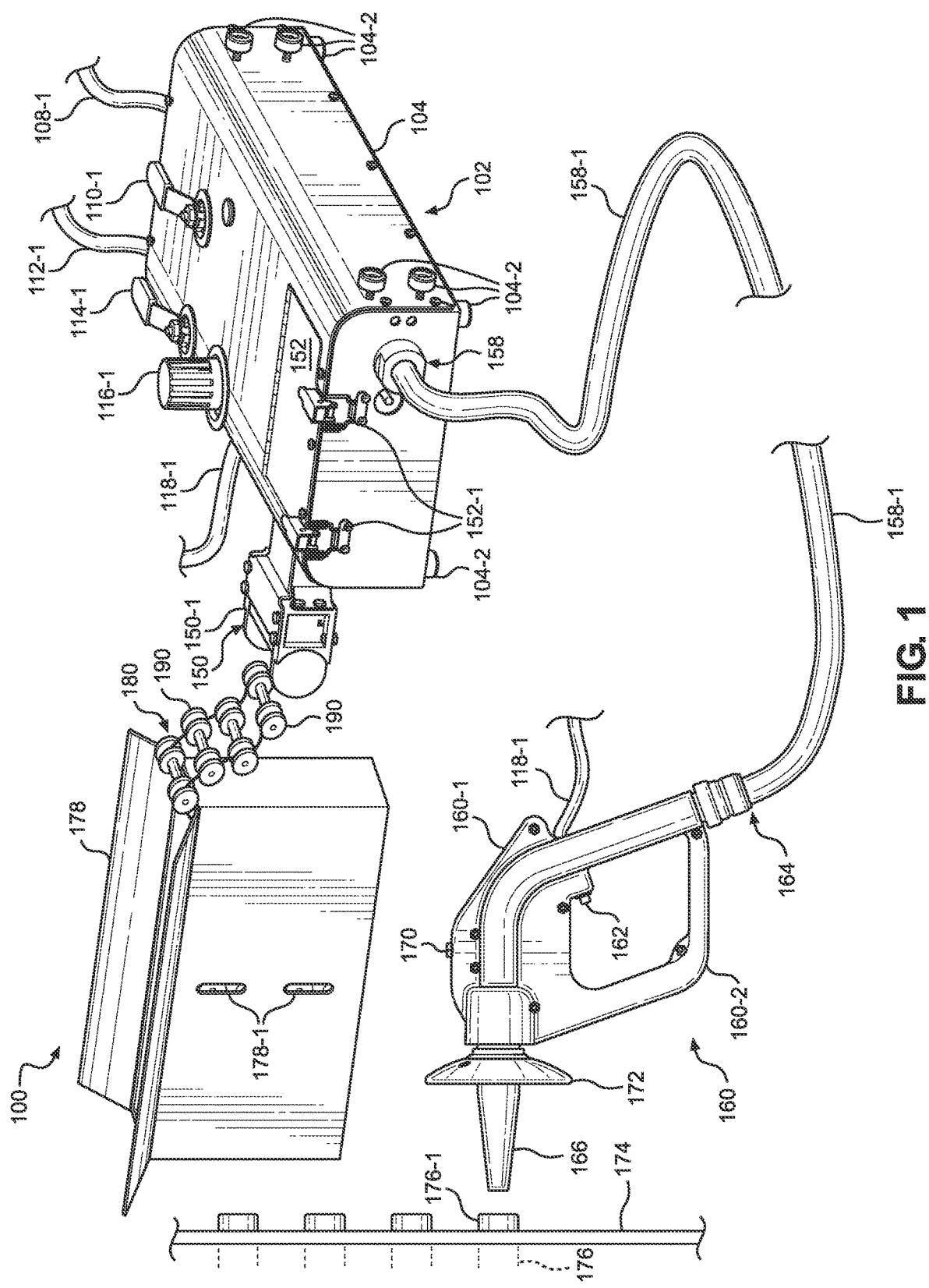
FIG. 1 is a perspective view of a belt-fed tube cleaning system according to some embodiments.
Figure 2A:
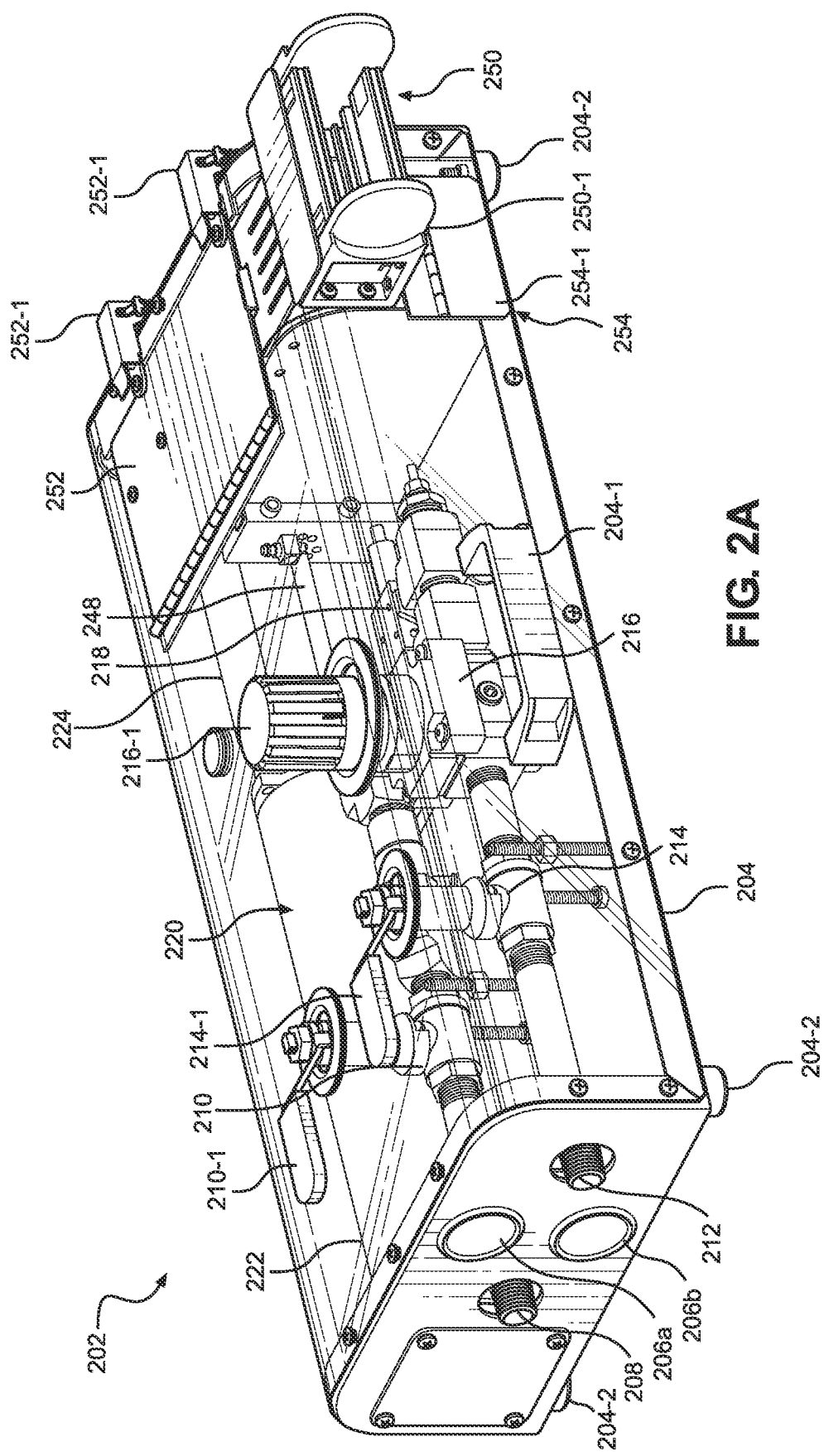
Figure 2F:
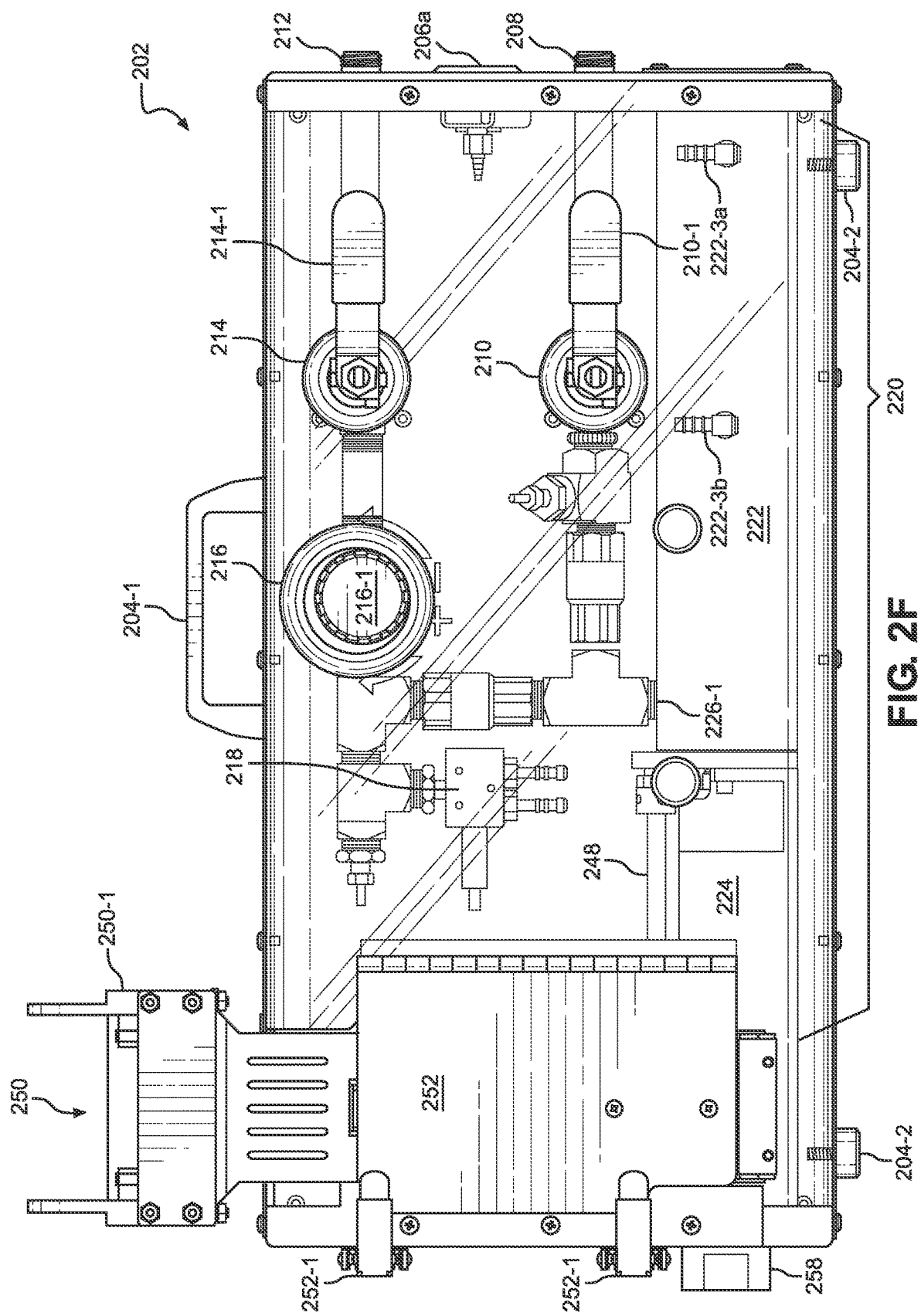
Figure 2G:
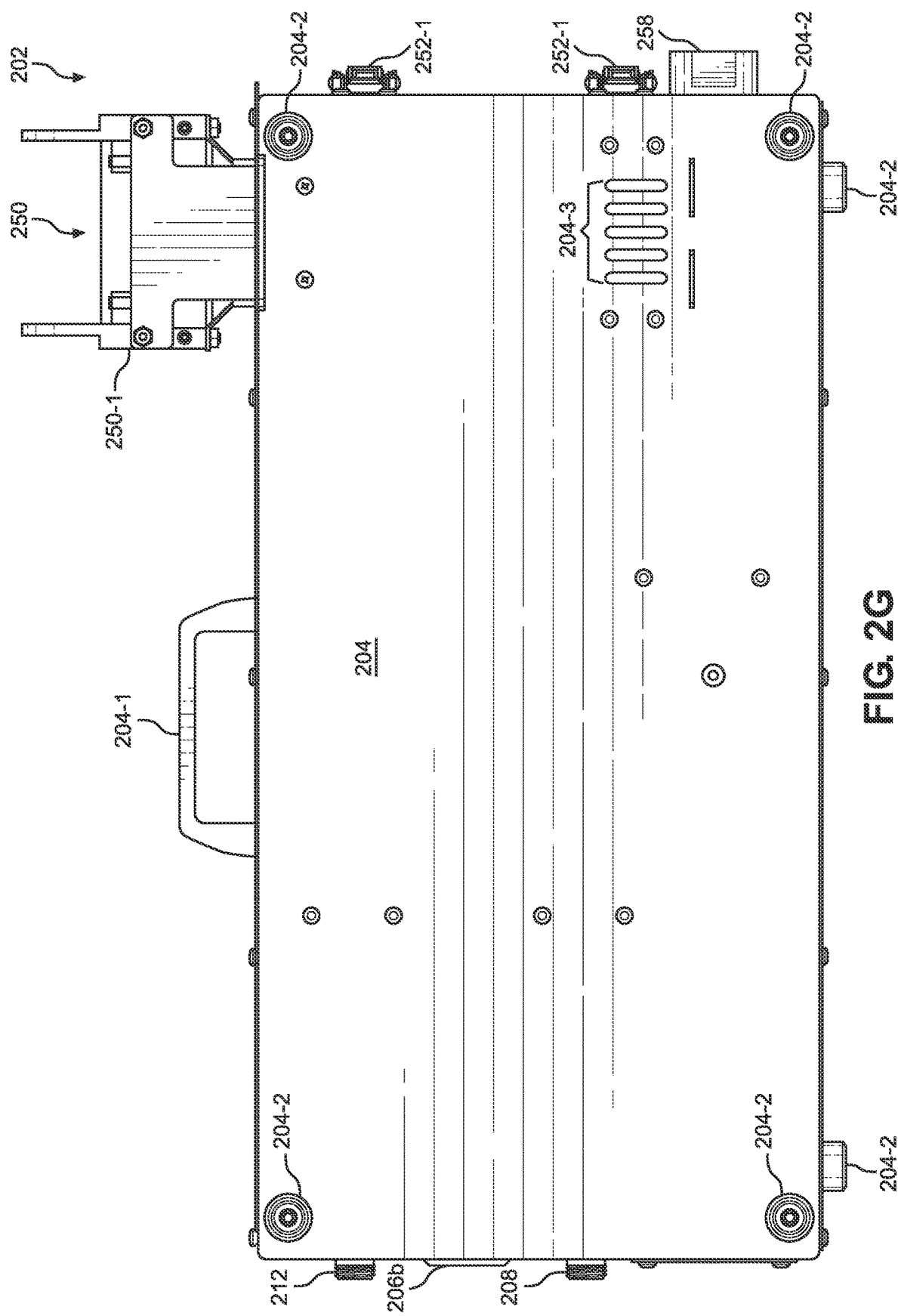

Turning initially to FIG. 1 a perspective view of a belt-fed tube cleaning system 100 according to some embodiments is shown. In some embodiments, the belt-fed tube cleaning system 100 may comprise a belt-fed tube cleaning projectile firing mechanism 102 comprising a body, frame, or housing 104. In some embodiments, the housing 104 may comprise one or more feet 104-2, e.g., to prevent marring of any surface (not shown) upon which the belt-fed tube cleaning projectile firing mechanism 102 may be placed during operation, storage, and/or transportation. According to some embodiments, the belt-fed tube cleaning projectile firing mechanism 102 may be powered by and/or may utilize various fluids such as pressurized water, air, gases (e.g., nitrogen), and/or combinations thereof. The belt-fed tube cleaning projectile firing mechanism 102 may be coupled to, for example, a first fluid conduit 108-1 that provides or supplies a first fluid (not explicitly shown), e.g., selectively controlled via a first valve handle 110-1. In some embodiments, the first fluid transported via the first fluid conduit 108-1 may comprise water and/or an aqueous mixture or solution. According to some embodiments, the belt-fed tube cleaning projectile firing mechanism 102 may be coupled to a second fluid conduit 112-1 that provides or supplies a second fluid (not explicitly shown), e.g., selectively controlled via a second valve handle 114-1. In some embodiments, the second fluid transported via the second fluid conduit 112-1 may comprise air and/or gas.

According to some embodiments, the belt-fed tube cleaning projectile firing mechanism 102 may distribute, utilize, and/or provide one or both of the fluids. The belt-fed tube cleaning projectile firing mechanism 102 may comprise, for example, a regulator knob 116-1 that is operable to selectively adjust/regulate flow of the second fluid through a control line 118-1. In some embodiments, the belt-fed tube cleaning projectile firing mechanism 102 may comprise a feed port 150, feed port housing 150-1, and/or feed cover 152. The feed cover 152 may be coupled to the housing 104, for example, via feed cover hinges 152-1, such that the feed cover 152 may be selectively rotated from a first or closed position (e.g., as depicted in FIG. 1) to at least one second or open position (not shown), permitting access to the inside of the housing 104 thereunder. According to some embodiments, the feed cover 152 (and/or the feed cover hinges 152-1) may be coupled to a safety valve (not shown) that prohibits activation and/or cycling of the belt-fed tube cleaning projectile firing mechanism 102 in the case that the feed cover 152 is disposed in the at least one second or open position (e.g., not in the first or closed position).

In some embodiments, the belt-fed tube cleaning projectile firing mechanism 102 may comprise an outlet port 158 via which the first fluid, second fluid, and/or other tube cleaning elements may be discharged, expelled, shot, and/or otherwise provided. The outlet port 158 may, for example, be coupled to an outlet hose 158-1 via which any desired cleaning substance(s) may be provided to a belt-fed tube cleaning projectile delivery mechanism 160. In some embodiments, the outlet port 158 and/or the outlet hose 158-1 (e.g., adjacent or proximate to the outlet port 158) may comprise and/or be coupled to one or more swivels or anti-kink mechanisms (not shown) to reduce kinking or binding of the outlet hose 158-1. The belt-fed tube cleaning projectile delivery mechanism 160 may comprise, for example, a housing or frame 160-1 forming a trigger guard 160-2 protecting a trigger assembly 162. According to some embodiments, the trigger assembly 162 may comprise a pneumatic actuator and/or valve coupled to selectively activate the belt-fed tube cleaning projectile firing mechanism 102 via the control line 118-1. In some embodiments, the trigger assembly 162 may comprise a wireless electronic communication device operable to transmit (and/or receive) signals to the belt-fed tube cleaning projectile firing mechanism 102 (e.g., a Radio Frequency (RF), Bluetooth®, or other short-range wireless communications device). Actuation of the trigger assembly 162 may, for example, cause a signal (e.g., electronic, pneumatic, pressure) to be sent via the control line 118-1 to the belt-fed tube cleaning projectile firing mechanism 102, causing the belt-fed tube cleaning projectile firing mechanism 102 to discharge cleaning agents/substances via the outlet port 158 and through the outlet hose 158-1. In some embodiments, the outlet hose 158-1 may be coupled to an inlet port 164 of the belt-fed tube cleaning projectile delivery mechanism 160 such that any cleaning substance(s) sent through the outlet hose 158-1 is received by the belt-fed tube cleaning projectile delivery mechanism 160. In some embodiments, the inlet port 164 and/or the outlet hose 158-1 (e.g., adjacent or proximate to the outlet inlet port 164) may comprise and/or be coupled to one or more swivels or anti-kink mechanisms (not shown) to reduce kinking or binding of the outlet hose 158-1.

According to some embodiments, the belt-fed tube cleaning projectile delivery mechanism 160 may direct the cleaning substance(s), e.g., by selective activation of the belt-fed tube cleaning projectile firing mechanism 102 via the trigger assembly 162, through a muzzle or nozzle 166. In some embodiments, the belt-fed tube cleaning projectile delivery mechanism 160 may comprise a firing indicator 170 and/or a splash shield 172. The belt-fed tube cleaning projectile delivery mechanism 160 may, for example, be directed toward a tube array face 174 in which a plurality of tubes 176 are housed, disposed, and/or oriented. According to some embodiments, cleaning substance(s) provided by the belt-fed tube cleaning projectile firing mechanism 102 may be directed by the belt-fed tube cleaning projectile delivery mechanism 160 (e.g., via the nozzle 166 thereof) toward a tube opening 176-1. During operation, the nozzle 166 would typically be inserted into the tube opening 176-1. The splash shield 172 may generally facilitate deflection of any blowback from the tube 176 away from an operator (not shown) holding the belt-fed tube cleaning projectile firing mechanism 102. In some embodiments, the firing indicator 170 may be configured to indicate to the operator when cleaning substance(s) are within the belt-fed tube cleaning projectile delivery mechanism 160 and/or the tube 176 (e.g., by being pressure-sensitive and configured to indicate positive pressure and/or pressure above a predetermined threshold amount).

In some embodiments, the belt-fed tube cleaning system 100 may comprise an ammunition or projectile box 178 having one or more viewports 178-1 through which a remaining quantity of a projectile feed belt 180 may be visually ascertained. The projectile feed belt 180 may comprise a plurality of interconnected tube cleaning projectiles 190 that are fed into the belt-fed tube cleaning projectile firing mechanism 102 via the feed port 150. According to some embodiments, the cleaning substance(s) provided by belt-fed tube cleaning projectile firing mechanism 102 to the belt-fed tube cleaning projectile delivery mechanism 160 may comprise the first fluid, the second fluid, and/or a tube cleaning projectile 190 from the projectile feed belt 180. The belt-fed tube cleaning projectile firing mechanism 102 may load, strip, and deliver a tube cleaning projectile 190 through the outlet hose 158-1 and into the belt-fed tube cleaning projectile delivery mechanism 160, for example, which may direct the tube cleaning projectile 190 (and/or a quantity of the one or more of the fluids) into the tube 176 to be cleaned. In some embodiments, each time the trigger assembly 162 is cycled, an additional tube cleaning projectile 190 (and/or another quantity of the one or more of the fluids) may be separated from the projectile feed belt 180 and discharged into the tube 176. In some embodiments, the feed port 150 and/or the feed port housing 150-1 may also or alternatively be configured as a manual feed port. The feed port 150 and/or the feed port housing 150-1 may, for example, be vertically oriented (e.g., as opposed to horizontally, as depicted) to permit a user to drop individual (or groups of) tube cleaning projectiles 190 into the belt-fed tube cleaning projectile firing mechanism 102 for individual firing. In some embodiments, tube cleaning projectiles 190 that failed to fire and have been retrieved from the belt-fed tube cleaning projectile firing mechanism 102 may be re-tried, in such a manner.

According to some embodiments, the belt-fed tube cleaning projectile delivery mechanism 160 may be coupled to and/or comprise a marking device (not shown in FIG. 1) for marking the tube array face 174 and/or the tube opening 176-1. The marking device may comprise, for example, an arm or bracket coupled to the frame 104 and oriented to introduce a marking substance (e.g., paint) to the tube array face 174 and/or the tube opening 176-1, e.g., upon engagement of the nozzle 166 with the tube 176 and/or upon firing of a tube cleaning projectile. In such a manner, for example, an operator of the belt-fed tube cleaning projectile delivery mechanism 160 may readily discern which tubes 176 have already been cleaned. In some embodiments, such a marking device may not be necessary or desired, such as in the case that the belt-fed tube cleaning projectile delivery mechanism 160 is oriented and/or translated by a computer-controlled device such as an automated Computer Numerical Control (CNC) gantry device (not shown).

While the terms "fire" or "firing" and "shot" are used generically herein for ease of reference in describing the discharge and delivery of the tube cleaning projectiles 190 herein, such terms are not intended to be limiting in nature and do not specifically refer to (and are not limited to) the use of primer, gunpowder, and/or other combustion or chemical-based propellant methods or mechanisms.

According to some embodiments, any or all of the components 102, 104, 104-1, 104-2, 108-1, 110-1, 112-1, 114-1, 116-1, 118-1, 150, 150-1, 152, 152-1, 158, 158-1, 160, 160-1, 160-2, 162, 164, 166, 170, 172, 174, 176, 176-1, 178, 178-1, 180, 190 of the belt-fed tube cleaning system 100 may be similar in configuration and/or functionality to any similarly named and/or numbered components described herein. Fewer or more components 102, 104, 104-1, 104-2, 108-1, 110-1, 112-1, 114-1, 116-1, 118-1, 150, 150-1, 152, 152-1, 158, 158-1, 160, 160-1, 160-2, 162, 164, 166, 170, 172, 174, 176, 176-1, 178, 178-1, 180, 190 (and/or portions thereof) and/or various configurations of the components 102, 104, 104-1, 104-2, 108-1, 110-1, 112-1, 114-1, 116-1, 118-1, 150, 150-1, 152, 152-1, 158, 158-1, 160, 160-1, 160-2, 162, 164, 166, 170, 172, 174, 176, 176-1, 178, 178-1, 180, 190 may be included in the belt-fed tube cleaning system 100 without deviating from the scope of embodiments described herein. In some embodiments, one or more of the various components 102, 104, 104-1, 104-2, 108-1, 110-1, 112-1, 114-1, 116-1, 118-1, 150, 150-1, 152, 152-1, 158, 158-1, 160, 160-1, 160-2, 162, 164, 166, 170, 172, 174, 176, 176-1, 178, 178-1, 180, 190 may not be needed and/or desired in the belt-fed tube cleaning system 100.

Referring now to FIG. 2A, FIG. 2B, FIG. 2C, FIG. 2D, FIG. 2E, FIG. 2F, and FIG. 2G, perspective, left-side, right-side, front, back, top, and bottom cut-away and cross-sectional views of a belt-fed tube cleaning projectile firing mechanism 202 according to some embodiments are shown. The belt-fed tube cleaning projectile firing mechanism 202 may, for example, be similar in function and/or configuration to the belt-fed tube cleaning projectile firing mechanism 102 of the belt-fed tube cleaning system 100 of FIG. 1 herein. In some embodiments, the belt-fed tube cleaning projectile firing mechanism 202 may comprise a housing 204 such as a plastic and/or sheet metal box having a handle 204-1, feet 204-2, and/or vent holes 204-3, as depicted. According to some embodiments, the housing 204 may retain and/or house various gauges 206*a-b* and/or may comprise various inlets or ports such as a first fluid port 208. The first fluid port 208 may, in some embodiments, comprise a liquid inlet such as a water port coupled to receive pressurized liquid (such as water) from a pressurized liquid source (not shown; such as a spigot). According to some embodiments, a first valve 210 having a first valve handle 210-1 may be utilized to selectively direct and/or govern the flow of the first fluid into the belt-fed tube cleaning projectile firing mechanism 202. In some embodiments, the belt-fed tube cleaning projectile firing mechanism 202 may comprise a second fluid port 212 that may comprise a gas inlet such as an air port coupled to receive pressurized gas (such as air and/or nitrogen) from a pressurized gas source (not shown; such as an gas cylinder, tank, or compressor). According to some embodiments, a second valve 214 having a second valve handle 214-1 may be utilized to selectively direct and/or govern the flow of the second fluid into the belt-fed tube cleaning projectile firing mechanism 202. In some embodiments, the belt-fed tube cleaning projectile firing mechanism 202 may comprise a regulator valve 216 having a regulator knob 216-1 that allows for selective control of the flow and/or pressure of the second fluid. According to some embodiments, such as in the case that the second fluid comprises air (or another gas) and is utilized to communicate with a separate projectile delivery mechanism (not shown; such as the belt-fed tube cleaning projectile delivery mechanism 160 of FIG. 1 herein), the belt-fed tube cleaning projectile firing mechanism 202 may comprise a control valve 218. The control valve 218 may, in response to an activation signal from the delivery mechanism for example, activate or trigger an action mechanism 220.

In some embodiments, the action mechanism 220 may comprise a piston cylinder 222 defining a piston cylinder volume 222-1. The piston cylinder 222 may comprise a substantially hollow body, for example, with a piston cylinder cap 222-2 sealing one end thereof, having one or more piston cylinder inlets 222-3*a-b* (e.g., to selectively receive the second fluid from the control valve 218) and/or with a piston 222-4 disposed therein (e.g., within the piston cylinder volume 222-1). According to some embodiments, the piston 222-4 may be coupled to or comprise a piston rod 222-5 extending axially through the piston cylinder volume 222-1 and defining a piston rod bore 222-6 therein. In some embodiments, such as in the case that the second fluid (e.g., a pressurized gas) is introduced into the piston cylinder volume 222-1 via the piston cylinder inlets 222-3*a-b*, for example, the second fluid may force the piston 222-4 to move axially within the piston cylinder volume 222-1.

According to some embodiments, the piston cylinder 222 may be in communication with (and/or axially aligned with) a ram head cylinder 224 that defines a ram head cylinder volume 224-1. In some embodiments, a distal end of the piston rod 222-5 may be coupled to a ram head 224-2 that defines a ram head bore 224-3 and/or is disposed in the ram head cylinder volume 224-1. According to some embodiments, the ram head 224-2 may comprise or define an indexing element 224-4 on a proximate end thereof (e.g., adjacent to the coupling of the piston rod 222-5). In some embodiments, a fluid chamber 226 may be disposed between the piston cylinder volume 222-1 and the ram head cylinder volume 224-1. According to some embodiments, the fluid chamber 226 may receive the first fluid from the first valve 210 via a fluid inlet 226-1. In some embodiments, in the case that the piston 222-4 and/or piston rod 222-5 are disposed in a first position (as depicted in FIG. 2C), the fluid chamber 226 may be sealed, e.g., by the outer diameter and/or outer surface of the piston rod 222-5. In some embodiments, in the case that the piston 222-4 and/or piston rod 222-5 are disposed in a second position (not shown; e.g., in the case that the piston 222-4 is acted upon by the first fluid received via the piston cylinder inlet(s) 222-3*a-b*), radial fluid ports 226-2 of the piston rod 222-5 may become aligned with the fluid chamber 226 and may accordingly receive fluid therefrom. According to some embodiments, any fluid received via the radial fluid ports 226-2 may pass through the piston rod bore 222-6 and into the ram head bore 224-3.

In some embodiments, the ram head 224-2 may be forced by the piston rod 222-5 into an action chamber 228 such that it engages with a tube cleaning projectile (not shown; such as the tube cleaning projectiles 190 of FIG. 1 herein). A tube cleaning projectile may be loaded into the action chamber 228 by a belt-fed tube cleaning projectile cylinder 240, for example, such as by the belt-fed tube cleaning projectile cylinder 240 acting upon a projectile feed belt (also not shown; such as the projectile feed belt 180 of FIG. 1 herein) to sever a tube cleaning projectile therefrom and load the tube cleaning projectile into the action chamber 228. In some embodiments, a cylinder shaft 248 may be coupled to drive a rotation of the belt-fed tube cleaning projectile cylinder 240 such that tube cleaning projectiles loaded into a feed port 250 as guided by a feed housing 250-1 and as part of a projectile feed belt may be passed into the action chamber 228. According to some embodiments, a feed cover 252 coupled to the housing 204 via feed cover hinges 252-1 may be disposed to selectively cover or provide access to the feed port 250 and/or the action chamber 228 (e.g., to inspect feed operations and/or to clear a jammed projectile feed belt). In some embodiments, tube cleaning projectiles and/or other debris or waste may be dropped or passed by the belt-fed tube cleaning projectile cylinder 240 into a feed outlet 254 having a feed outlet cover 254-1 (e.g., a hinged door, as depicted).

According to some embodiments, operation of the belt-fed tube cleaning projectile firing mechanism 202 may include a tube cleaning projectile being guided by belt-fed tube cleaning projectile cylinder 240 and/or a feed guide 256 into the action chamber 228 and then forced axially from the action chamber 228 by the ram head 224-2, and into an outlet port 258. In some embodiment, the ram head 224-2 may extend through the action chamber 228 and into the outlet port 258 such that any fluid within the ram head bore 224-3 may also (or alternatively) be discharged into and/or via the outlet port 258. In such a manner, for example, the belt-fed tube cleaning projectile firing mechanism 202 may selectively and repeatedly discharge tube cleaning projectiles and/or other cleaning fluids or substances via the outlet port 258 (e.g., to facilitate tube cleaning operations). According to some embodiments, in the case of blowback and/or excess pressure experienced by the outlet port 258 and/or the action chamber 228, fluids may be vented and/or expelled via the vent holes 204-3 disposed beneath the action chamber 228 (e.g., visible in the bottom view of FIG. 2G).

In some embodiments, any or all of the components 204, 204-1, 204-2, 204-3, 206*a-b*, 208, 210, 210-1, 212, 214, 214-1, 216, 216-1, 218, 220, 222, 222-1, 222-2, 222-3*a-b*, 222-4, 222-5, 222-6, 224, 224-1, 224-2, 224-3, 224-4, 226, 226-1, 226-2, 228, 240, 248, 250, 250-1, 252, 252-1, 254, 254-1, 256, 258 of the belt-fed tube cleaning projectile firing mechanism 202 may be similar in configuration and/or functionality to any similarly named and/or numbered components described herein. Fewer or more components 204, 204-1, 204-2, 204-3, 206*a-b*, 208, 210, 210-1, 212, 214, 214-1, 216, 216-1, 218, 220, 222, 222-1, 222-2, 222-3*a-b*, 222-4, 222-5, 222-6, 224, 224-1, 224-2, 224-3, 224-4, 226, 226-1, 226-2, 228, 240, 248, 250, 250-1, 252, 252-1, 254, 254-1, 256, 258 (and/or portions thereof) and/or various configurations of the components 204, 204-1, 204-2, 204-3, 206*a-b*, 208, 210, 210-1, 212, 214, 214-1, 216, 216-1, 218, 220, 222, 222-1, 222-2, 222-3*a-b*, 222-4, 222-5, 222-6, 224, 224-1, 224-2, 224-3, 224-4, 226, 226-1, 226-2, 228, 240, 248, 250, 250-1, 252, 252-1, 254, 254-1, 256, 258 may be included in the belt-fed tube cleaning projectile firing mechanism 202 without deviating from the scope of embodiments described herein. In some embodiments, one or more of the various components 204, 204-1, 204-2, 204-3, 206*a-b*, 208, 210, 210-1, 212, 214, 214-1, 216, 216-1, 218, 220, 222, 222-1, 222-2, 222-3*a-b*, 222-4, 222-5, 222-6, 224, 224-1, 224-2, 224-3, 224-4, 226, 226-1, 226-2, 228, 240, 248, 250, 250-1, 252, 252-1, 254, 254-1, 256, 258 may not be needed and/or desired in the belt-fed tube cleaning projectile firing mechanism 202.

Figure 3:
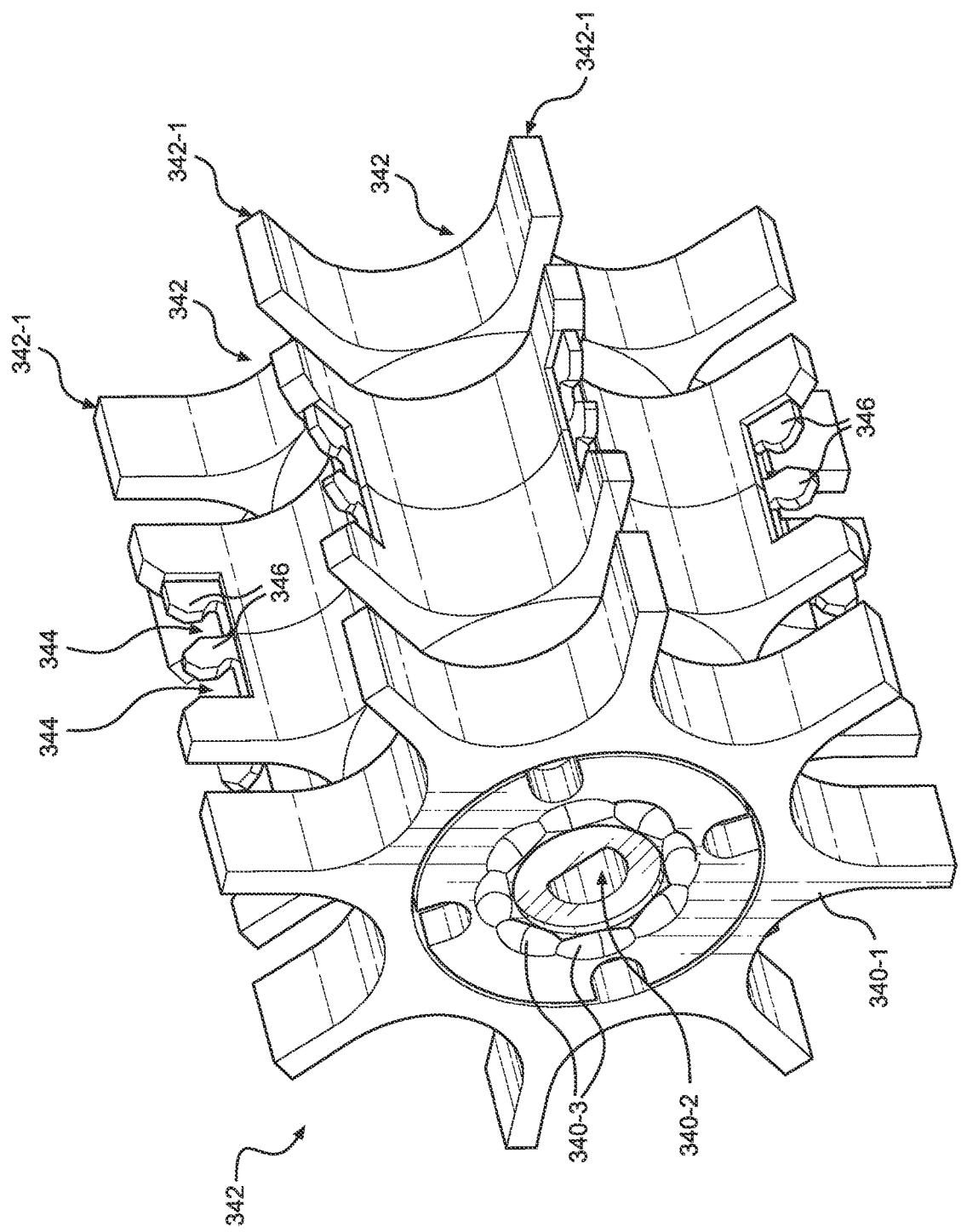
FIG. 3 is an upper-left front perspective view of a belt-fed tube cleaning projectile cylinder according to some embodiments.

Turning now to FIG. 3, an upper-left front perspective view of a belt-fed tube cleaning projectile cylinder 340 according to some embodiments is shown. In some embodiments, the belt-fed tube cleaning projectile cylinder 340 may comprise a substantially cylindrical body 340-1 extending along an axis and defining a central passage or shaft bore 340-2 extending axially from one end of the belt-fed tube cleaning projectile cylinder 340 to the other. In some embodiments, the belt-fed tube cleaning projectile cylinder 340 may comprise a plurality of indexing detents 340-3 disposed and/or formed on at least one axially oriented face of the belt-fed tube cleaning projectile cylinder 340. The indexing detents 340-3 may, for example, be uniformly disposed on the face and about or around the shaft bore 340-2. According to some embodiments, the indexing detents 340-3 may be shaped to accept one or more projections (not shown) that permit and/or facilitate rotational indexing of the belt-fed tube cleaning projectile cylinder 340 (e.g., with respect to a projectile path within and/or defined by a belt-fed tube cleaning projectile firing mechanism (not shown in FIG. 3; such as the belt-fed tube cleaning projectile firing mechanism 102 of FIG. 1 herein).

According to some embodiments, the belt-fed tube cleaning projectile cylinder 340 may define and/or comprise a plurality of axially oriented projectile slots or chambers 342. As depicted in FIG. 3, such projectile chambers 342 may be substantially cylindrical shaped, such as to allow for, accept, and/or guide tube cleaning projectiles (not shown in FIG. 3; such as the tube cleaning projectiles 190 of FIG. 1 herein) as described herein. In some embodiments, the projectile chambers 342 may be equally and radially spaced about the circumference of the belt-fed tube cleaning projectile cylinder 340 (e.g., as depicted in FIG. 3). According to some embodiments, portions of the belt-fed tube cleaning projectile cylinder 340 such as slot dividers, ridges, or chamber dividers 342-1 may be disposed between each projectile chamber 342 (e.g., extending axially along an outer diameter of the belt-fed tube cleaning projectile cylinder 340).

In some embodiments, one or more belt channels 344 and/or cutting elements 346 may be disposed between the projectile chambers 342. As depicted in FIG. 3, for example, two belt channels 344 may be formed or cut into (or otherwise coupled to or defined by) each chamber dividers 342-1 between each set of adjacent projectile chambers 342. Fewer or more belt channels 344 may be included as desired to accommodate various configurations of projectile feed belts (not shown in FIG. 3; such as the projectile feed belt 180 of FIG. 1 herein). In some embodiments, the chamber dividers 342-1 and/or the belt channels 344 may comprise or be coupled to one or more of the cutting elements 346. According to some embodiments, the cutting elements 346 may be disposed to engage with portions of a projectile feed belt such as belt connector segments that enter the belt channels 344 and/or to engage with the belt segments upon loading and/or firing of a projectile. The cutting elements 346 may, for example, comprise pointed and/or sharpened objects that exert resistive and/or cutting force on a belt segment as it is inserted radially inward into a belt channel 344 and/or may exert the resistive and/or cutting force on the belt segment in the case it is moved axially within the belt channel(s) 344. In some embodiments, the cutting elements 346 may comprise one or more objects such as a tooth, blade, and/or projection that applies pressure, an unlatching force, and/or a cutting force to the belt segments and thereby causes a separation thereof.

According to some embodiments, any or all of the components 340-1, 340-2, 340-3, 342, 342-1, 344, 346 of the belt-fed tube cleaning projectile cylinder 340 may be similar in configuration and/or functionality to any similarly named and/or numbered components described herein. Fewer or more components 340-1, 340-2, 340-3, 342, 342-1, 344, 346 (and/or portions thereof) and/or various configurations of the components 340-1, 340-2, 340-3, 342, 342-1, 344, 346 may be included in the belt-fed tube cleaning projectile cylinder 340 without deviating from the scope of embodiments described herein. In some embodiments, one or more of the various components 340-1, 340-2, 340-3, 342, 342-1, 344, 346 may not be needed and/or desired in the belt-fed tube cleaning projectile cylinder 340.

Figure 4A:
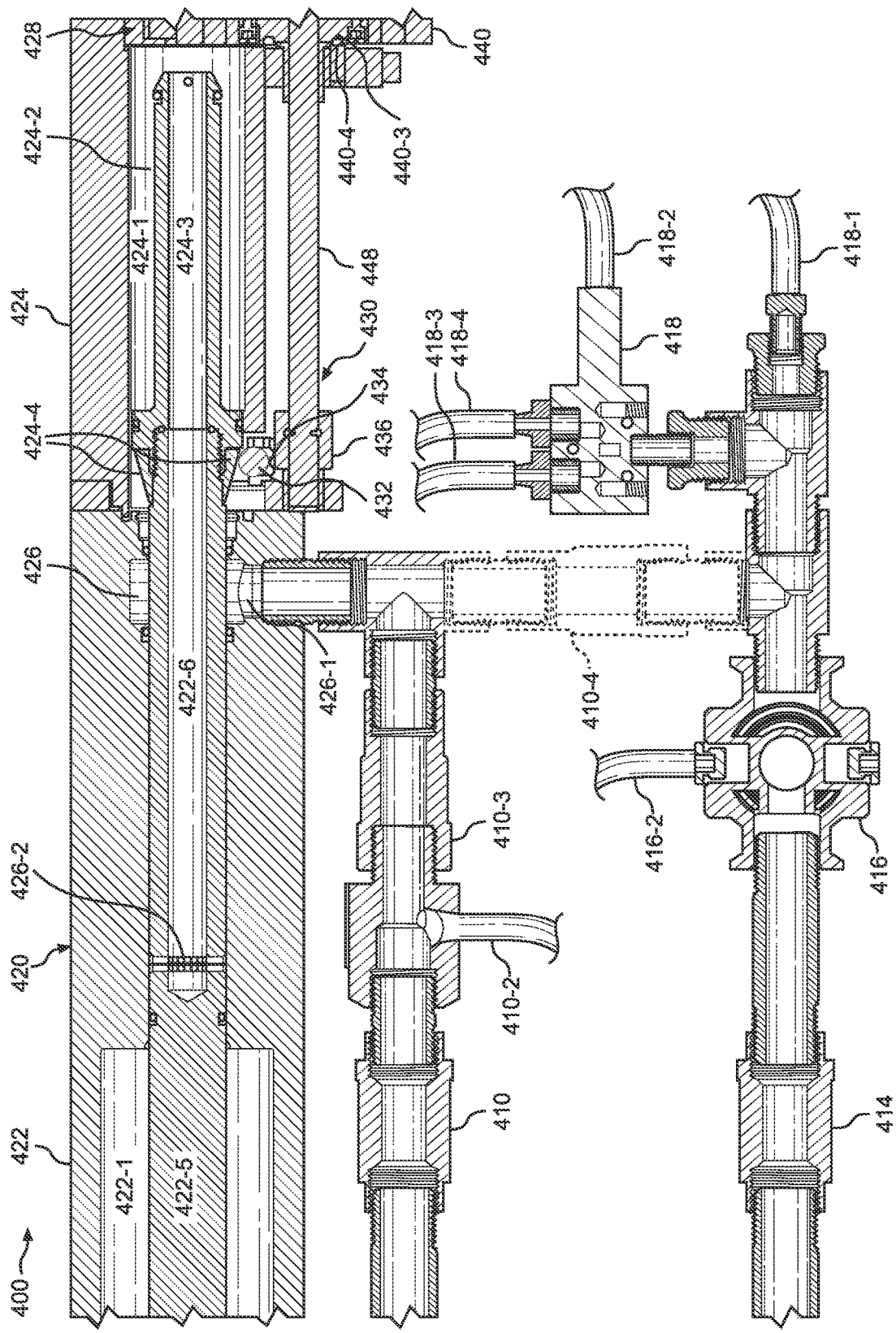
FIG. 4A and FIG. 4B are partial cross-sectional top views of a belt-fed tube cleaning projectile firing mechanism according to some embodiments.
Figure 4B:
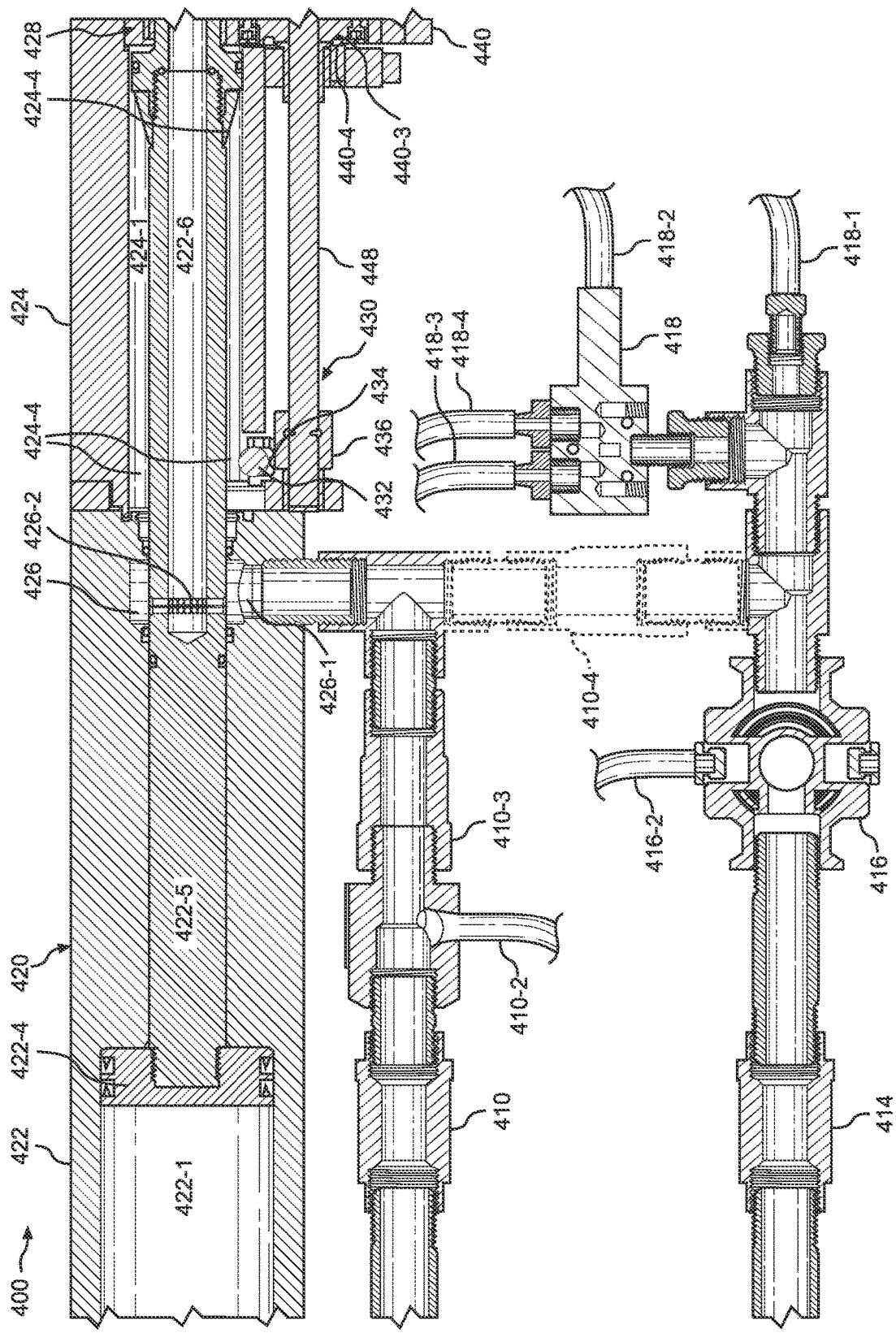

Referring now to FIG. 4A and FIG. 4B, partial cross-sectional top views of a belt-fed tube cleaning projectile firing mechanism 400 according to some embodiments are shown. In some embodiments, the belt-fed tube cleaning projectile firing mechanism 400 depicted in FIG. 4A and FIG. 4B may comprise a depiction of a portion of a larger belt-fed tube cleaning system such as the belt-fed tube cleaning system 100 of FIG. 1 herein. According to some embodiments, the belt-fed tube cleaning projectile firing mechanism 400 depicted in FIG. 4A may be descriptive of a first state of the belt-fed tube cleaning projectile firing mechanism 400 at a first time and FIG. 4B may be descriptive of a second state of the belt-fed tube cleaning projectile firing mechanism 400 at a second time. The first state may comprise an at-rest state at a rest or inactive time, for example, and/or the second state may comprise a firing or active state at a firing or activation time.

According to some embodiments, the belt-fed tube cleaning projectile firing mechanism 400 may comprise a first valve 410 such as a ball valve coupled to govern flow of a first fluid such as water. In some embodiments, the first fluid may be directed by a gauge line 410-2 to a first fluid gauge (not shown) and/or one or more check valves 410-3, 410-4 may be disposed in the path of the first fluid. According to some embodiments, the belt-fed tube cleaning projectile firing mechanism 400 may comprise a second valve 414 such as a ball valve coupled to govern flow of a second fluid such as air (or one or more particular gases, such as nitrogen). In some embodiments, a regulator valve 416 may be coupled to accept the second fluid from the second valve 414 and/or to provide the second fluid via a gauge line 416-2 to a second fluid gauge (also not shown). In some embodiments, the belt-fed tube cleaning projectile firing mechanism 400 may comprise a control valve 418 that selectively distributes and/or manages the flow of the second fluid.

The second fluid may be directed via a control line 418-1 to a tube cleaning projectile delivery mechanism (not shown; such as the belt-fed tube cleaning projectile delivery mechanism 160 of FIG. 1 herein), for example, and may be selectively returned to the control valve 418 via a return line 418-2. In some embodiments, the control valve 418 may, upon receiving second fluid (and/or other signals) via the return line 418-2 for example, selectively distribute the second fluid to one or more of a cylinder charge line 418-3 and a cylinder reverse line 418-4, e.g., to activate and/or cycle an action mechanism 420. According to some embodiments, the control valve 418 may utilize the cylinder charge line 418-3 to utilize the second fluid to pressurize a piston cylinder of the action mechanism 420. The piston cylinder 422 may define a piston cylinder volume 422-1, for example, into which the second fluid may be directed via the cylinder charge line 418-3. Such pressurization and/or activation may, in some embodiments, cause axial movement (along an axis of the piston cylinder 422 and/or of the action mechanism 420) of a piston 422-4 and/or connected piston rod 422-5 defining a piston rod bore 422-6.

As depicted in FIG. 4A, at the first time for example, the piston 422-4 is not visible, for being disposed in a portion of the piston cylinder volume 422-1 to the left of the depicted view. The piston rod 422-5 may extend, at the first time in FIG. 4A, throughout the piston cylinder 422 and partially into a ram head cylinder 424 coupled thereto. At the second time depicted in FIG. 4B, the piston 422-4 may have been forced to the visible extent of the piston cylinder volume 422-1 and accordingly have forced the piston rod 422-5 to extend substantially into a ram head cylinder volume 424-1 defined by the ram head cylinder 424. In some embodiments, a ram head 424-2 defining a ram head bore 424-3 may be coupled to a distal end of the piston rod 422-5, e.g., in the ram head cylinder volume 424-1. According to some embodiments, the ram head 424-2 may define and/or comprise an exterior flange or indexing element 424-4 proximate to the coupling of the ram head 424-2 and the piston rod 422-5. In some embodiments, the ram head 424-2 and the piston rod 422-5 may be coupled such that the ram head bore 424-3 and the piston rod bore 422-6 may be axially aligned and/or in communication (e.g., volumetrically connected or contiguous).

According to some embodiments, a fluid chamber 426 may be disposed between the piston cylinder 422 (and/or the piston cylinder volume 422-1) and the ram head cylinder 424 (and/or the ram head cylinder volume 424-1). The fluid chamber 426 may, for example, be coupled via a fluid inlet 426-1 to receive the first and/or second fluid. In the case that both a first check valve 410-3 and a second check valve 410-4 and associated connections and conduits are provided in the belt-fed tube cleaning projectile firing mechanism 400, for example, the fluid inlet 426-1 may provide a mixture of the first and second fluids into the fluid chamber 426. In some embodiments, the second check valve 410-4 and associated connections (e.g., shown in dotted lines) may not be utilized, such that only the first fluid is provided a conduit into the fluid chamber 426. According to some embodiments, such as at the first time depicted in FIG. 4A, the fluid chamber 426 may be capable of receiving fluid flow from the fluid inlet 426-1 but may otherwise be sealed off by the piston rod 422-5. According to some embodiments, the fluid chamber 426 may become aligned and/or in communication with one or more radial fluid ports 426-2 that extend into the piston rod bore 422-6.

In some embodiments for example, in the case that the belt-fed tube cleaning projectile firing mechanism 400 is activated, e.g., at the second time depicted in FIG. 4B and/or by an activation of the control valve 418 via the cylinder charge line 418-3, the ram head 424-2 may be forced by the piston rod 422-5 into an action chamber 428. The ram head 424-2 may act upon a tube cleaning projectile (not shown; such as the tube cleaning projectile 190 of FIG. 1 herein) disposed in the action chamber 428, for example, such as to discharge the projectile from the belt-fed tube cleaning projectile firing mechanism 400. In the case that the ram head 424-2 is disposed in the action chamber 428, such as depicted at the second time in FIG. 4B, the radial fluid ports 426-2 may become aligned with the fluid chamber 426 such that fluid therein may flow into the piston rod bore 422-6 and further into the ram head bore 424-3. In such a manner, for example, fluid may be expelled or discharged following the tube cleaning projectile.

According to some embodiments, the belt-fed tube cleaning projectile firing mechanism 400 may comprise a cam indexer 430 that is coupled to selectively introduce tube cleaning projectiles into the action chamber 428, e.g., after each cycling of the action mechanism 420. The cam indexer 430 may comprise, for example, an indexer post 432 that houses and/or retains an indexer pawl 434 at the radial extents of the axial travel path of the indexing element 424-4 of the ram head 424-2. After a tube cleaning projectile has been fired at the second time depicted in FIG. 4B, for example, the control valve 418 may depressurize or apply reverse pressure force to the piston cylinder volume 422-1 via the cylinder reverse line 418-4, forcing the piston 422-4 away from the fluid chamber 426 and accordingly causing the piston rod 422-5 to pull the ram head 424-2 toward the position depicted in FIG. 4A. According to some embodiments, as shown in FIG. 4A, the indexing element 424-4 may contact and/or engage with the indexer pawl 434, which in response may engage with an indexer gear or ratchet 436 disposed to cycle a new tube cleaning projectile into the action chamber 428.

In some embodiments, a belt-fed tube cleaning projectile cylinder 440 may be coupled to the indexer ratchet 436 to selectively introduce additional tube cleaning projectiles upon a cycling of the action mechanism 420. According to some embodiments, the belt-fed tube cleaning projectile cylinder 440 may be coupled to rotate about an axis (e.g., parallel to and offset from an axis of the action mechanism 420) and to rotationally index at intervals to load tube cleaning projectiles, e.g., one at a time and/or from a tube cleaning projectile feed belt (not shown; such as the projectile feed belt 180 of FIG. 1 herein). The rotational indexing may, in some embodiments, be accomplished by utilizing radially spaced indexing detents 440-3 on a face of the belt-fed tube cleaning projectile cylinder 440 that are disposed to selectively engage with, e.g., at spaced rotational distances, one or more corresponding indexing projections 440-4. According to some embodiments, the belt-fed tube cleaning projectile cylinder 440 may be coupled to a cylinder shaft 448 that rotates about the cylinder axis. In some embodiments, the cylinder shaft 448 and/or the belt-fed tube cleaning projectile cylinder 440 may be keyed such that rotation of the belt-fed tube cleaning projectile cylinder 440 imparts rotational force to the cylinder shaft 448 and/or rotation of the cylinder shaft 448 imparts rotational force to the belt-fed tube cleaning projectile cylinder 440. According to some embodiments, a first end of the cylinder shaft 448 may be keyed and/or coupled to the belt-fed tube cleaning projectile cylinder 440 and a second end of the cylinder shaft 448 may comprise and/or be coupled to the indexer ratchet 436. In such a manner, for example, cycling of the action mechanism 420 may cause the indexing element 424-4 of the ram head 424-2 to engage with the indexer pawl 434, which advances the indexer ratchet 436, which in turn causes a rotation of the cylinder shaft 448, which further causes one of the indexing detents 440-3 to disengage with the indexing projection 440-4. According to some embodiments, the configuration of the indexer ratchet 436 and/or the indexing detents 440-3 may limit the rotation of the belt-fed tube cleaning projectile cylinder 440 to a predefined rotational distance upon each cycling of the action mechanism 420. In some embodiments, the indexer pawl 434 may engage with the indexer ratchet 436 to prevent the indexer ratchet 436 from advancing rotationally in a direction opposite to that imparted by the indexer pawl 434 (e.g., preventing reverse rotational movement).

According to some embodiments, the indexing detent(s) 440-3 may, for example, be cooperative with a spring-loaded plunger or ball comprising the indexing projection(s) 440-4 coupled to the belt-fed tube cleaning projectile firing mechanism 402 to selectively seat within an opposing indexing detent 440-3 of the belt-fed tube cleaning projectile cylinder 440. The indexing detent(s) 440-3 may be shaped, for example, such that a certain rotational force applied to the belt-fed tube cleaning projectile cylinder 440 may depress the ball, plunger, and/or other biased element of the indexing projection(s) 440-4 and thereby allow the belt-fed tube cleaning projectile cylinder 440 to rotate from a first position (where the indexing projection(s) 440-4 is seated in a first indexing detent 440-3) to a second position (where the indexing projection(s) 440-4 becomes seated in a second indexing detent 440-3 disposed at a radially-offset position from the indexing detent 440-3).

In some embodiments, any or all of the components 402, 410, 410-2, 410-3, 410-4, 414, 416, 416-2, 418, 418-1, 418-2, 418-3, 418-4, 420, 422, 422-1, 422-4, 422-5, 422-6, 424, 424-1, 424-2, 424-3, 424-4, 426, 426-1, 426-2, 428, 432, 434, 436, 440, 440-3, 440-4, 448 of the belt-fed tube cleaning projectile firing mechanism 400 may be similar in configuration and/or functionality to any similarly named and/or numbered components described herein. Fewer or more components 402, 410, 410-2, 410-3, 410-4, 414, 416, 416-2, 418, 418-1, 418-2, 418-3, 418-4, 420, 422, 422-1, 422-4, 422-5, 422-6, 424, 424-1, 424-2, 424-3, 424-4, 426, 426-1, 426-2, 428, 432, 434, 436, 440, 440-3, 440-4, 448 (and/or portions thereof) and/or various configurations of the components 402, 410, 410-2, 410-3, 410-4, 414, 416, 416-2, 418, 418-1, 418-2, 418-3, 418-4, 420, 422, 422-1, 422-4, 422-5, 422-6, 424, 424-1, 424-2, 424-3, 424-4, 426, 426-1, 426-2, 428, 432, 434, 436, 440, 440-3, 440-4, 448 may be included in the belt-fed tube cleaning projectile firing mechanism 400 without deviating from the scope of embodiments described herein. In some embodiments, one or more of the various components 402, 410, 410-2, 410-3, 410-4, 414, 416, 416-2, 418, 418-1, 418-2, 418-3, 418-4, 420, 422, 422-1, 422-4, 422-5, 422-6, 424, 424-1, 424-2, 424-3, 424-4, 426, 426-1, 426-2, 428, 432, 434, 436, 440, 440-3, 440-4, 448 may not be needed and/or desired in the belt-fed tube cleaning projectile firing mechanism 400.

Referring now to FIG. 5A, FIG. 5B, FIG. 5C, and FIG. 5D, side views and side cross-sectional views of a belt-fed tube cleaning projectile delivery mechanism 560 according to some embodiments are shown. In some embodiments, the belt-fed tube cleaning projectile delivery mechanism 560 may comprise a housing or frame 560-1 and/or a trigger guard 560-2 protecting and/or housing a trigger assembly 562. According to some embodiments, the frame 560-1 and/or the trigger guard 560-2 may be constructed of plastic, metal, and/or other light-weight materials capable of withstanding the operating pressures up to about one hundred and fifty pounds per square inch (150 psi). In some embodiments, the trigger assembly 562 may comprise a pneumatic valve and/or other communication device operable to send signals to a firing device (not shown; such as the belt-fed tube cleaning projectile firing mechanism 102 of FIG. 1 herein). The trigger assembly 562 may, for example, be selectively activated to cause a firing/discharge of a tube cleaning projectile (not shown; such as the tube cleaning projectiles 190 of FIG. 1 herein) by the firing device and a receiving of the projectile (and/or other cleaning substances such as a cleaning fluid) via an inlet port 564. In some embodiments, the projectile and/or fluid may be delivered and/or expelled by the belt-fed tube cleaning projectile delivery mechanism 560 through a barrel or nozzle 566 and into a tube (not shown; such as the tube 176 of FIG. 1 herein).

According to some embodiments, the belt-fed tube cleaning projectile delivery mechanism 560 and/or the frame 560-1 thereof may define a bore 566-1 extending between the inlet port 562 and through the nozzle 566 and/or may comprise an exterior flange 566-2 disposed adjacent to the frame 560-1. In some embodiments, the trigger assembly 562 may be in communication with a safety mechanism 568, such as to prevent undesired and/or dangerous discharge of the belt-fed tube cleaning projectile delivery mechanism 560. The safety mechanism 568 may, in some embodiments, only permit discharge of a projectile in the event that the nozzle 566 is inserted into a tube to be cleaned, thereby depressing or actuating the safety mechanism 568. The safety mechanism 568 may, for example, be coupled to permit activation of the trigger assembly 562 in the case that the nozzle 566 is pressed into a tube by having the nozzle 566 slidably coupled to the frame 560-1. As show in FIG. 5C, for example, the belt-fed tube cleaning projectile delivery mechanism 560 may be depicted at a first time when the belt-fed tube cleaning projectile delivery mechanism 560 is not inserted into a tube as represented by a first distance "A" between the frame 560-1 and the exterior flange 566-2 of the nozzle 566. At such a first time, a safety valve 568-1 of the safety mechanism 568 may comprise a plunger 568-2 that is disposed in a first or extended position. In such a position, the plunger 568-2 may cause the safety valve 568-1 to be disposed in a first state where the trigger assembly 562 is deactivated. In the first state, for example, the safety valve 568-1 may cause a pneumatic circuit (not shown) in communication with the trigger assembly 562 to be opened to the atmosphere, preventing pressurization thereof.

Figure 5A:
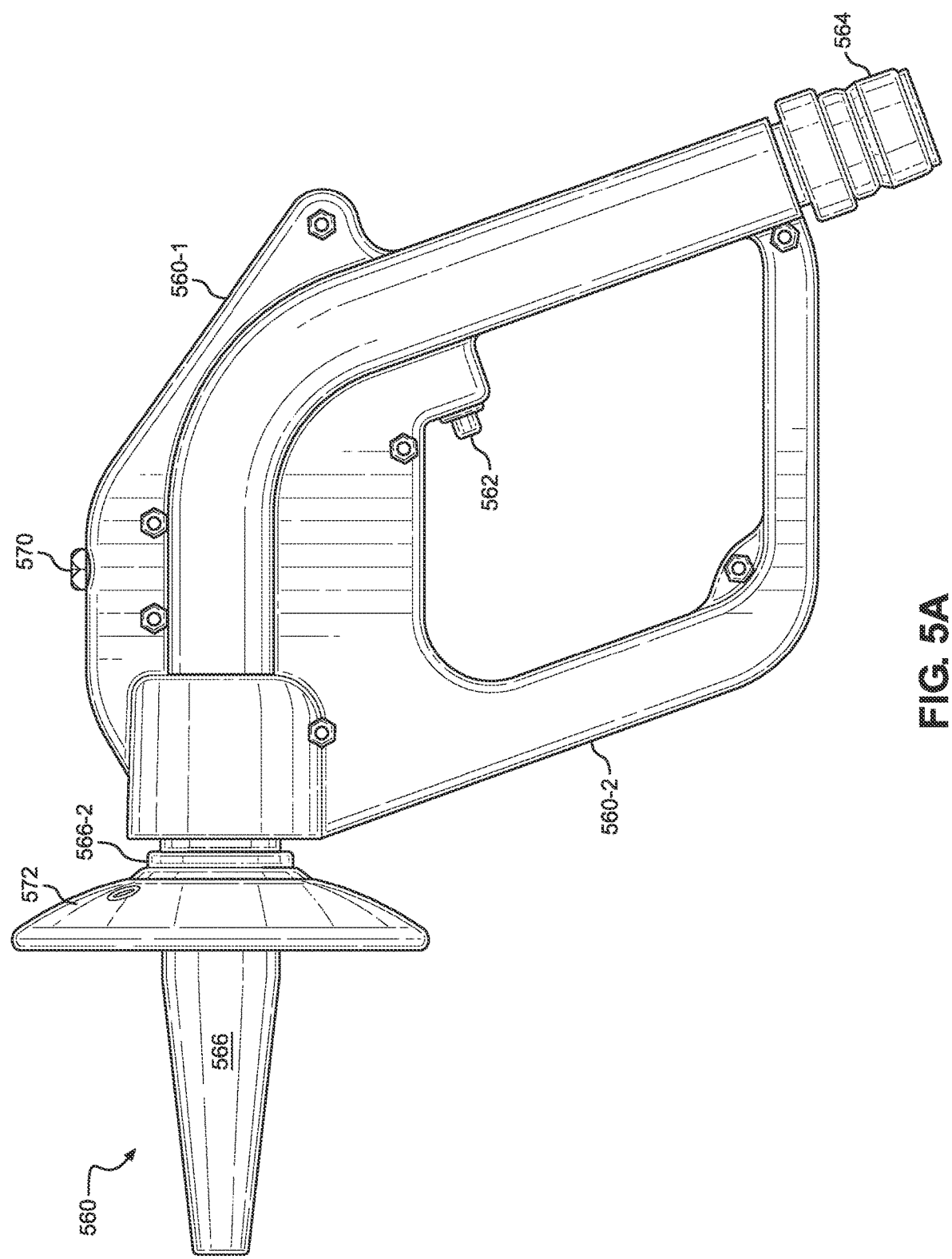
FIG. 5A, FIG. 5B, FIG. 5C, and FIG. 5D are side views and side cross-sectional views of a belt-fed tube cleaning projectile delivery mechanism according to some embodiments.
Figure 5B:
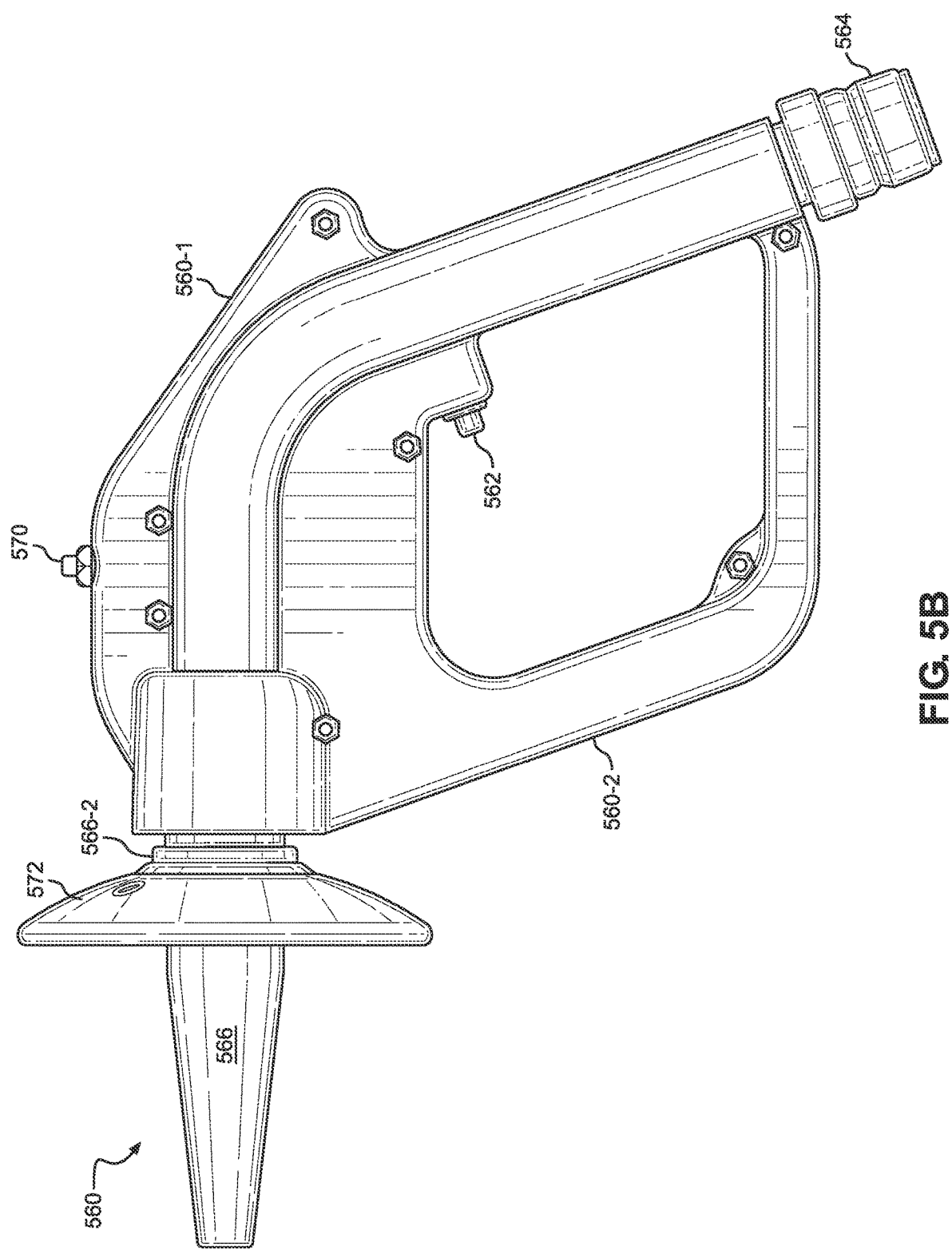
Figure 5C:
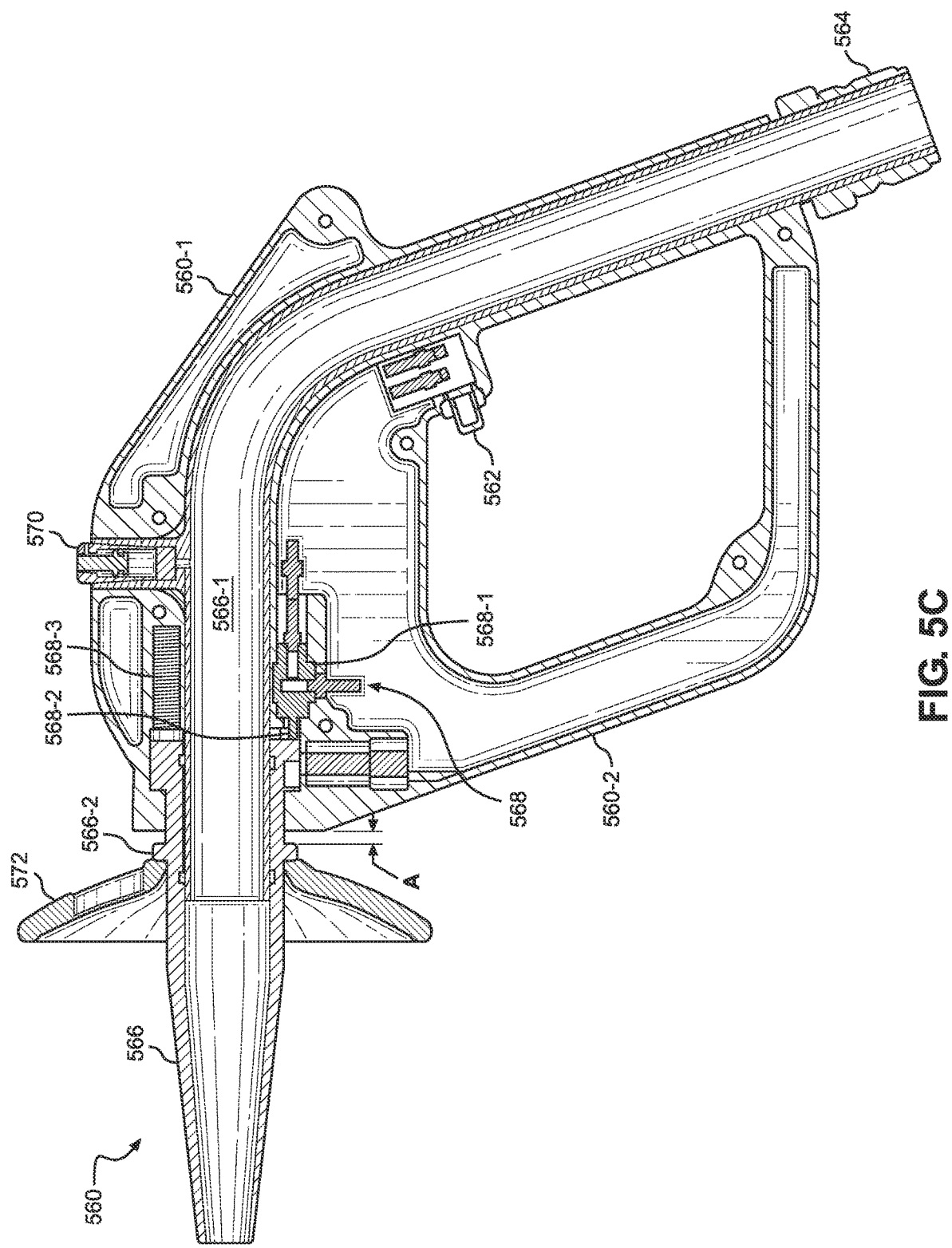
Figure 5D:
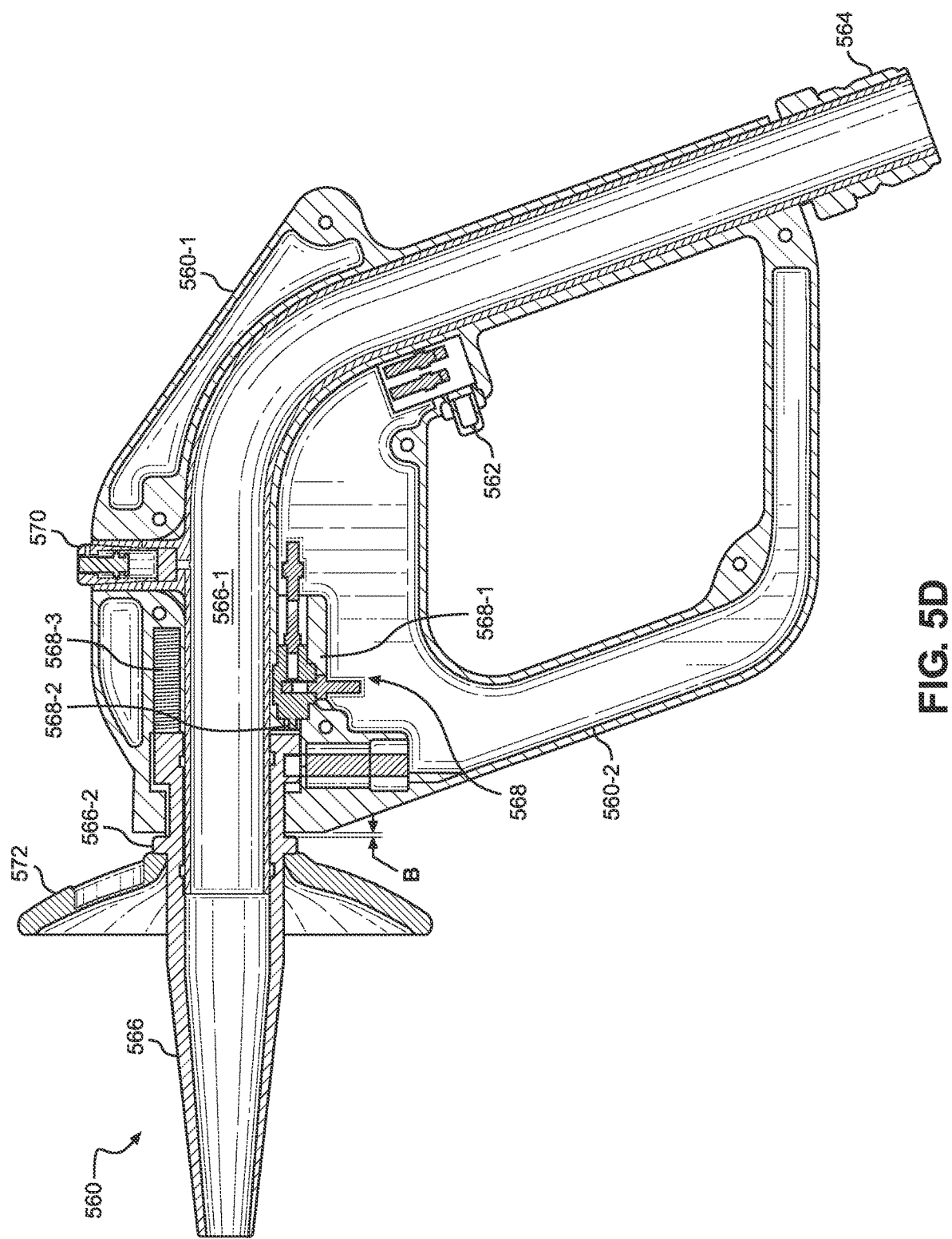

According to some embodiments, as show in FIG. 5D for example, the belt-fed tube cleaning projectile delivery mechanism 560 may be depicted at a second time when the belt-fed tube cleaning projectile delivery mechanism 560 is inserted into a tube as represented by a second distance "B" between the frame 560-1 and the exterior flange 566-2 of the nozzle 566. As depicted, the second distance "B" is less than the first distance "A". In some embodiments, the second distance "B" may be substantially zero, as the exterior flange 566-2 may engage with the frame 560-1. At such a second time, the plunger 568-2 of the safety valve 568-1 may be disposed in a second or retracted position. In such a position, the plunger 568-2 may cause the safety valve 568-1 to be disposed in a second state where the trigger assembly 562 is activated. In the second state, for example, the safety valve 568-1 may cause a pneumatic circuit in communication with the trigger assembly 562 to be closed to the atmosphere, thereby permitting pressurization thereof. According to some embodiments, in the case that the belt-fed tube cleaning projectile delivery mechanism 560 is removed from the tube and the nozzle 566 is no longer forced toward the frame 560-1, a return spring 568-3 disposed in the housing 560-1 and engaged with the nozzle 566 may apply an axial force that urges the nozzle 560 away from the frame 560-2, e.g., such that the first distance "A" is obtained and/or the safety mechanism 568 is reengaged to disable the trigger assembly 562.

In some embodiments, the belt-fed tube cleaning projectile delivery mechanism 560 may comprise a projectile or firing indicator 570 that provides a visual indication descriptive of whether a projectile is currently loaded into the bore 566-1 and/or whether the bore 566-1 is pressurized (e.g., beyond a certain threshold of pressurization). According to some embodiments, the belt-fed tube cleaning projectile delivery mechanism 560 and/or the nozzle 566 thereof may comprise and/or be coupled to a splash shield 572. The splash shield 572 may comprise a parabolic feature coupled to extend radially outward from the nozzle 566, for example, such that blowback from a tube being cleaned may be directed away from an operator (not shown; e.g., whether human or computer-controlled) of the belt-fed tube cleaning projectile delivery mechanism 560.

In some embodiments, various accessories (not shown) may be selectively coupled to the frame 560-1. Flashlights, grips, tube marking devices, sensors, cameras, and/or other advantageous objects or combinations of objects may be selectively attached to an integrated rail (not shown), for example, such as an attachment rail configured in accordance with a dovetail, Weaver-style, and/or MIL-STD-1913 or "Picatinny"-style specifications as published by the Picatinny Arsenal of Morris County, NJ (Feb. 3, 1995).

According to some embodiments, any or all of the components 560-1, 560-2, 562, 564, 566, 566-1, 566-2, 568, 568-1, 568-2, 568-3, 570, 572 of the belt-fed tube cleaning projectile delivery mechanism 560 may be similar in configuration and/or functionality to any similarly named and/or numbered components described herein. Fewer or more components 560-1, 560-2, 562, 564, 566, 566-1, 566-2, 568, 568-1, 568-2, 568-3, 570, 572 (and/or portions thereof) and/or various configurations of the components 560-1, 560-2, 562, 564, 566, 566-1, 566-2, 568, 568-1, 568-2, 568-3, 570, 572 may be included in the belt-fed tube cleaning projectile delivery mechanism 560 without deviating from the scope of embodiments described herein. In some embodiments, one or more of the various components 560-1, 560-2, 562, 564, 566, 566-1, 566-2, 568, 568-1, 568-2, 568-3, 570, 572 may not be needed and/or desired in the belt-fed tube cleaning projectile delivery mechanism 560.

Figure 6A:
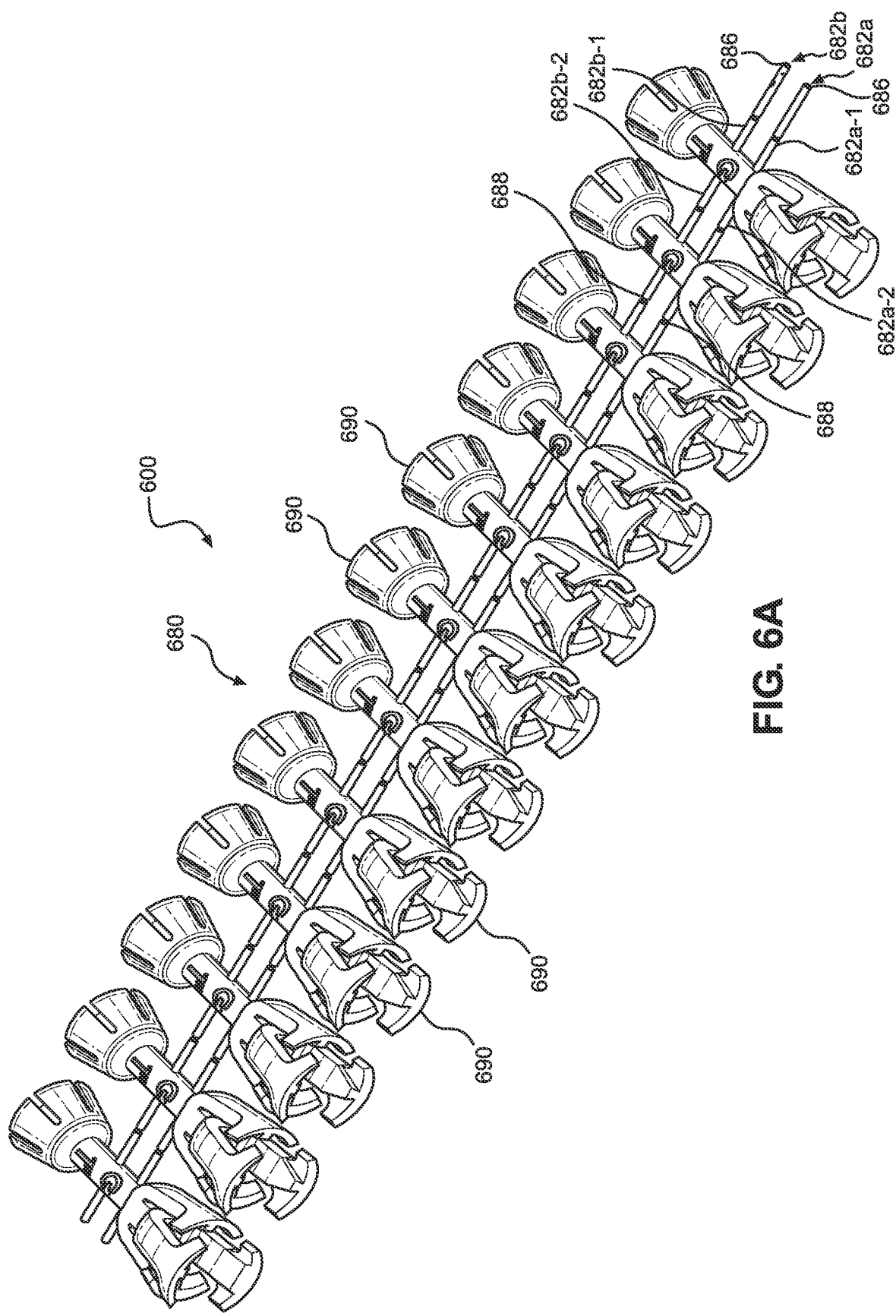

Turning now to FIG. 6A and FIG. 6B, perspective views of a belt-fed tube cleaning projectile system 600 according to some embodiments are shown. In some embodiments, the belt-fed tube cleaning projectile system 600 may comprise a projectile feed belt 680 comprising various belt segments 682a-b. According to some embodiments, the belt segments 682a-b may comprise one or more coupling features 686 and/or severance features 688. As depicted in FIG. 6A, for example, the projectile feed belt 680 may comprise a plurality of tube cleaning projectiles 690 coupled together via the various belt segments 682a-b with severance features 688 disposed between each adjacent projectile 690.

In some embodiments, the severance features 688 may comprise pre-defined areas of reduced cross-sectional area, with a perforated diameter, or otherwise specifically weakened at one or more points along the belt segments 682a-b.

While the severance features 688 are depicted near or at the middle of the belt segments 682*a-b* between adjacent connected tube cleaning projectiles 690, the severance features 688 may be disposed at different and/or additional locations (e.g., at or adjacent to one or more of the tube cleaning projectiles 690). According to some embodiments, the severance features 688 may be acted upon by a mechanism (e.g., a protrusion, cutter, blade, etc.) of a delivery device (not shown in FIG. 6A or FIG. 6B; such as the cutting elements 346 of the belt-fed tube cleaning projectile cylinder 340 of FIG. 3 herein) as the projectile feed belt 680 is loaded therein, such that adjacent tube cleaning projectiles 690 are selectively separated. In such a manner, for example, each tube cleaning projectile 690 may be severed from neighboring tube cleaning projectiles 690 as they are fed into a firing and/or delivery device for individual propulsion into a tube (not shown in FIG. 6A or FIG. 6B; such as the tube 176 of FIG. 1 herein) to be cleaned. In some embodiments, the severance features 688 may comprise and/or be coupled to, or at, one or more of the coupling features 686, such as one or more couplings, latches, and/or bindings that are disengaged and/or uncoupled by the delivery device, e.g., such that severance of adjacent tube cleaning projectiles 690 maintains the integrity of the coupling features 686, permitting re-use of the tube cleaning projectiles 690 in a projectile feed belt 680 and/or otherwise permitting re-assembly of the projectile feed belt 680.

According to some embodiments, each tube cleaning projectile 690 may comprise and/or be coupled to a pair of first or leading belt segments 682*a*-1, 682*b*-1 emanating radially outward, in a first direction, from an axial body 692 of the tube cleaning projectile 690. In some embodiments, each tube cleaning projectile 690 may comprise and/or be coupled to a pair of second or trailing belt segments 682*a*-2, 682*b*-2 emanating radially outward, in a second direction, from the axial body 692 of the tube cleaning projectile 690. As depicted in FIG. 6A and FIG. 6B, the first and second directions may be opposing such that pairs of leading belt segments 682*a*-1, 682*b*-1 coupled to pairs of trailing belt segments 682*a*-2, 682*b*-2 between adjacent tube cleaning projectiles 690 define the projectile feed belt 680.

In some embodiments, the tube cleaning projectiles 690 may comprise molded tube scraper projectiles comprising an integral tail segment 692-1 coupled to and/or formed by the body 692 at a first axial end thereof and/or a plurality of scraping or cutting surfaces 694 disposed at a second axial end thereof. According to some embodiments, the tail segment 692-1 may comprise a vented frustoconical cone, a cup, and/or fins for accepting fluid and/or pneumatic force from a tube cleaning projectile firing mechanism (not shown in FIG. 6A or FIG. 6B; such as the belt-fed tube cleaning projectile firing mechanism 102 of FIG. 1 herein). In some embodiments, one or more of the coupling features 686 and/or the severance features 688 may formed in or on the body 692 of the tube cleaning projectiles 690. In such a manner, for example, adjacent tube cleaning projectiles 690 may be mated and/or coupled via insertion of coupling features 686 of one or more of the belt segments 682*a-b* directly into or onto the body 692. The coupling features 686 may comprise latch or coupling features, for example, that may be selectively and/or removably coupled to the tube cleaning projectiles 690 by insertion of such latch or coupling features into the body 692 or into a belt segment 682*a-b*. The coupling features 686 and/or the severance features 688 (which may comprise the same or cooperative structures or objects) may comprise any of various practicable cable connecting and/or coupling mechanisms that are or become known or practicable.

In some embodiments, any or all of the components 680, 682*a-b*, 682*a*-1, 682*b*-1, 682*a*-2, 682*b*-2, 686, 688, 690, 692, 692-1, 694 of the belt-fed tube cleaning projectile system 600 may be similar in configuration and/or functionality to any similarly named and/or numbered components described herein. Fewer or more components 680, 682*a-b*, 682*a*-1, 682*b*-1, 682*a*-2, 682*b*-2, 686, 688, 690, 692, 692-1, 694 (and/or portions thereof) and/or various configurations of the components 680, 682*a-b*, 682*a*-1, 682*b*-1, 682*a*-2, 682*b*-2, 686, 688, 690, 692, 692-1, 694 may be included in the belt-fed tube cleaning projectile system 600 without deviating from the scope of embodiments described herein. In some embodiments, one or more of the various components 680, 682*a-b*, 682*a*-1, 682*b*-1, 682*a*-2, 682*b*-2, 686, 688, 690, 692, 692-1, 694 may not be needed and/or desired in the belt-fed tube cleaning projectile system 600.

Figure 7A:
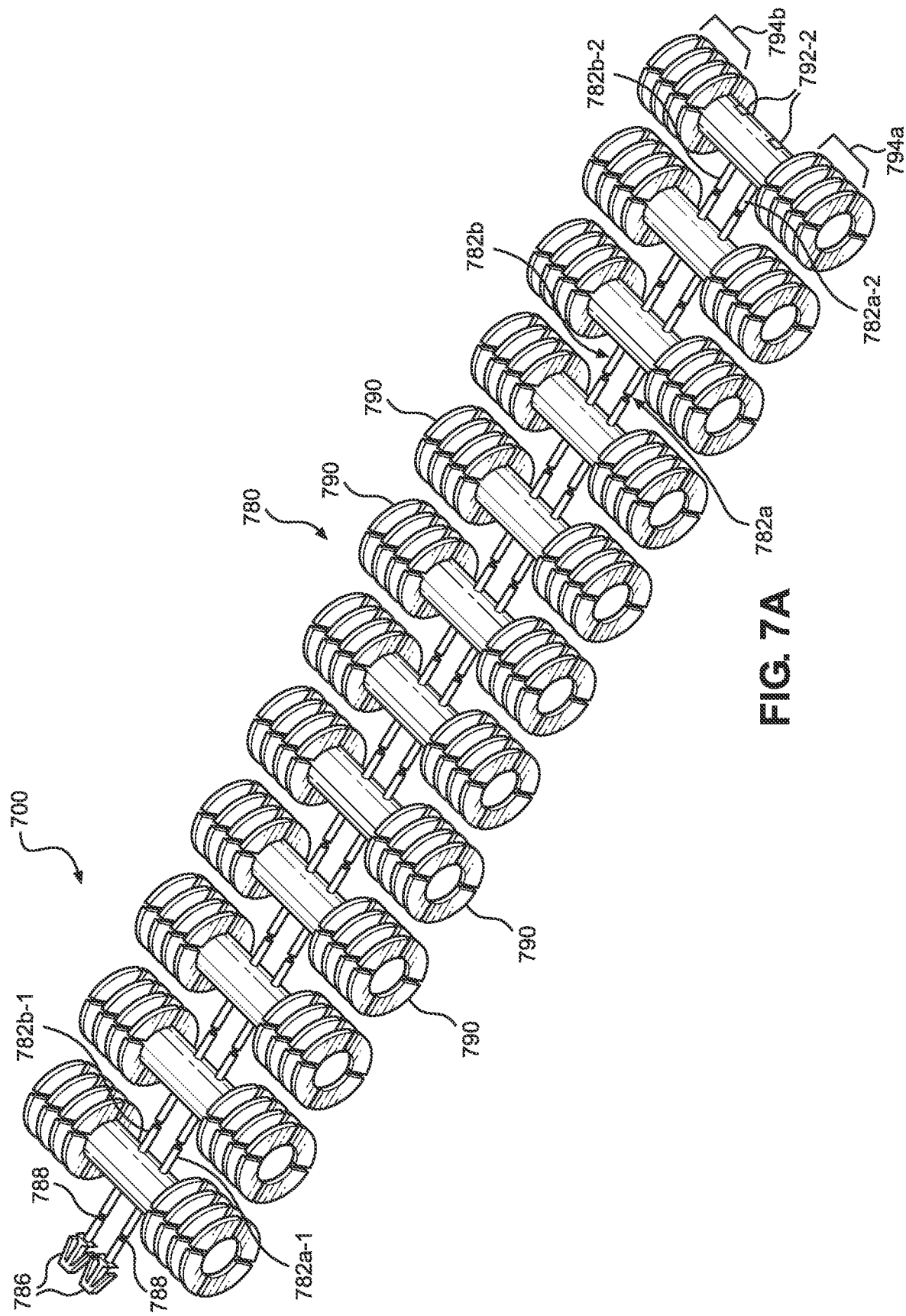
FIG. 7A and FIG. 7B are perspective views of a belt-fed tube cleaning projectile system according to some embodiments.
Figure 7B:
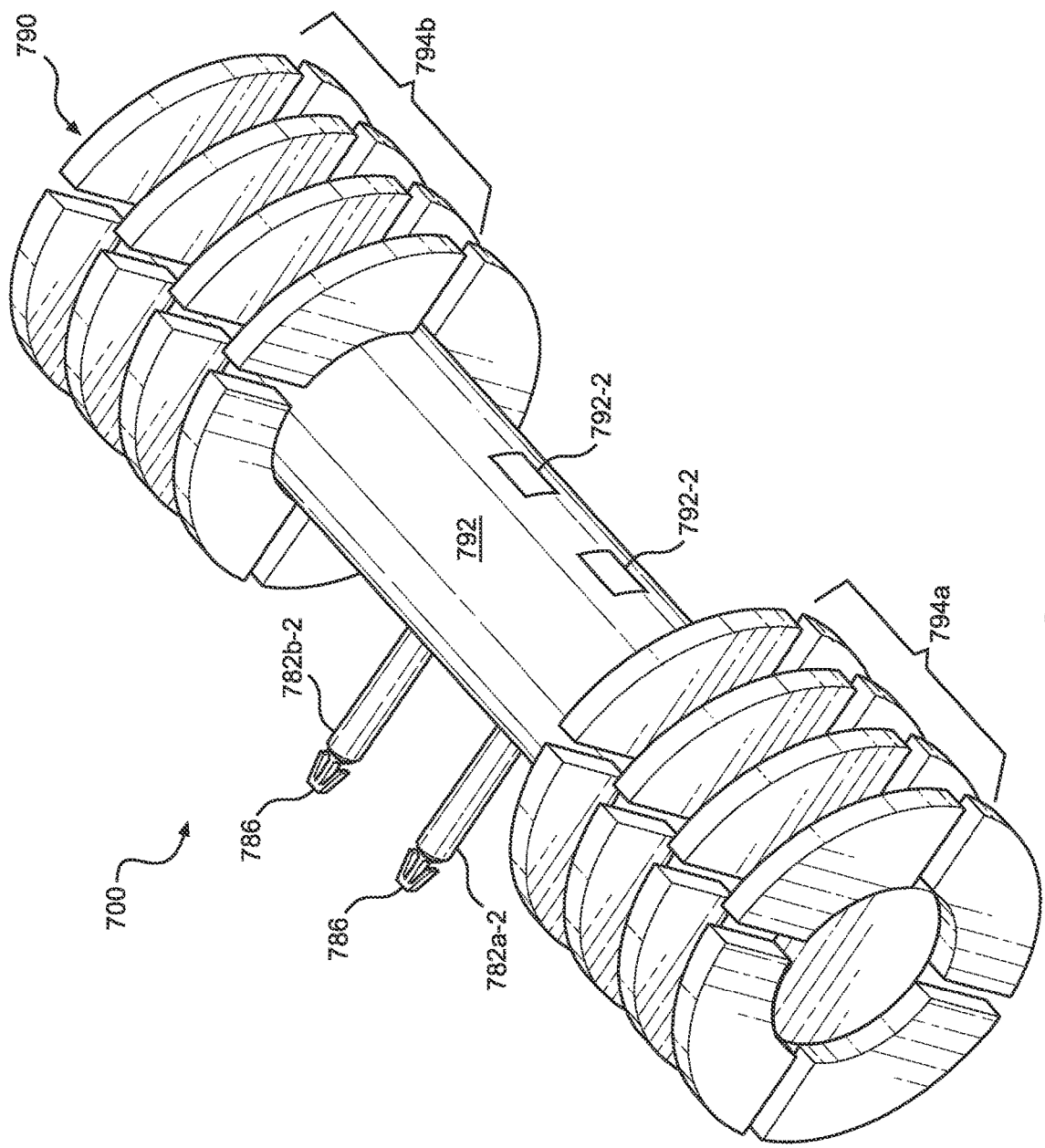

Referring now to FIG. 7A and FIG. 7B, perspective views of a belt-fed tube cleaning projectile system 700 according to some embodiments are shown. In some embodiments, the belt-fed tube cleaning projectile system 700 may comprise a projectile feed belt 780 comprising various belt segments 782*a-b*. According to some embodiments, the belt segments 782*a-b* may comprise one or more coupling features 786 and/or severance features 788. As depicted in FIG. 7A, for example, the projectile feed belt 780 may comprise a plurality of tube cleaning projectiles 790 coupled together via the various belt segments 782*a-b* with severance features 788 disposed between each adjacent projectile 790.

In some embodiments, the severance features 788 may comprise pre-defined areas of reduced cross-sectional area, with a perforated diameter, or otherwise specifically weakened at one or more points along the belt segments 782*a-b*. While the severance features 788 are depicted near or at the middle of the belt segments 782*a-b* between adjacent connected tube cleaning projectiles 790, the severance features 788 may be disposed at different and/or additional locations (e.g., at or adjacent to one or more of the tube cleaning projectiles 790). According to some embodiments, the severance features 788 may be acted upon by a mechanism (e.g., a protrusion, cutter, blade, etc.) of a delivery device (not shown in FIG. 7A or FIG. 7B; such as the cutting elements 346 of the belt-fed tube cleaning projectile cylinder 340 of FIG. 3 herein) as the projectile feed belt 780 is loaded therein, such that adjacent tube cleaning projectiles 790 are selectively separated. In such a manner, for example, each tube cleaning projectile 790 may be severed from neighboring tube cleaning projectiles 790 as they are fed into a firing and/or delivery device for individual propulsion into a tube (not shown in FIG. 7A or FIG. 7B; such as the tube 176 of FIG. 1 herein) to be cleaned. In some embodiments, the severance features 788 may comprise and/or be coupled to, or at, one or more of the coupling features 786, such as one or more couplings, latches, and/or bindings that are disengaged and/or uncoupled by the delivery device, e.g., such that severance of adjacent tube cleaning projectiles 790 maintains the integrity of the coupling features 786, permitting re-use of the tube cleaning projectiles 790 in a projectile feed belt 780 and/or otherwise permitting re-assembly of the projectile feed belt 780.

According to some embodiments, any or all of the tube cleaning projectiles 790 may comprise and/or be coupled to a pair of first or leading belt segments 782*a*-1, 782*b*-1 emanating radially outward, in a first direction, from an axial body 792 of the tube cleaning projectile 790. In some embodiments, any or all tube cleaning projectiles 790 may comprise and/or be coupled to a pair of second or trailing belt segments 782*a*-2, 782*b*-2 emanating radially outward, in a second direction, from the axial body 792 of the tube cleaning projectile 790. As depicted in FIG. 7A and FIG. 7B, the first and second directions may be opposing such that pairs of leading belt segments 782*a*-1, 782*b*-1 coupled to pairs of trailing belt segments 782*a*-2, 782*b*-2 between adjacent tube cleaning projectiles 790 define the projectile feed belt 780.

In some embodiments, any or all of the tube cleaning projectiles 790 may comprise molded tube scraper projectiles comprising one or more coupling features 792-2 coupled to and/or formed by the body 792 (e.g., on at least one side of the body 792 thereof) and/or a plurality of scraping or cutting surfaces 794*a*-*b* disposed at one or more axial ends thereof. According to some embodiments, the coupling features 792-2 may be configured to accept, mate with, and/or otherwise couple to the coupling features 786 of the projectile feed belt 780. In the case that the coupling features 786 of the projectile feed belt 780 comprise biased locking tabs as depicted in FIG. 7A, for example, the coupling features 792-2 on the body 792 of the tube cleaning projectile 790 may comprise appropriately configured and spaced mating slots, as depicted in FIG. 7B. According to some embodiments, such coupling features 792-2 of the body 792 of the tube cleaning projectiles 790 and/or such coupling features 786 of the projectile feed belt 780, may be formed at intervals along the projectile feed belt 780. The projectile feed belt 780 may be manufactured and/or assembled in segments, for example, such as the exemplary segment of projectile feed belt 780 depicted in FIG. 7A, that comprises one dozen (e.g., twelve (12)) tube cleaning projectiles 790 with one pair of coupling features 786 of the projectile feed belt 780 disposed at one end of the segment and with one pair of coupling features 792-2 on the body 792 of one of the tube cleaning projectiles 790 at the other end of the segment. In such a manner, for example, multiple segments of projectile feed belts 780 (not shown; only one being depicted in FIG. 7A) may be coupled together end-to-end, as desired (e.g., for continuous operation of a belt-fed tube cleaning firing mechanism and/or system as described herein).

In some embodiments, any or all of the components 780, 782*a*-*b*, 782*a*-1, 782*b*-1, 782*a*-2, 782*b*-2, 786, 788, 790, 792, 792-2, 794*a*-*b* of the belt-fed tube cleaning projectile system 700 may be similar in configuration and/or functionality to any similarly named and/or numbered components described herein. Fewer or more components 780, 782*a*-*b*, 782*a*-1, 782*b*-1, 782*a*-2, 782*b*-2, 786, 788, 790, 792, 792-2, 794*a*-*b* (and/or portions thereof) and/or various configurations of the components 780, 782*a*-*b*, 782*a*-1, 782*b*-1, 782*a*-2, 782*b*-2, 786, 788, 790, 792, 792-2, 794*a*-*b* may be included in the belt-fed tube cleaning projectile system 700 without deviating from the scope of embodiments described herein. In some embodiments, one or more of the various components 780, 782*a*-*b*, 782*a*-1, 782*b*-1, 782*a*-2, 782*b*-2, 786, 788, 790, 792, 792-2, 794*a*-*b* may not be needed and/or desired in the belt-fed tube cleaning projectile system 700.

Figure 8A:
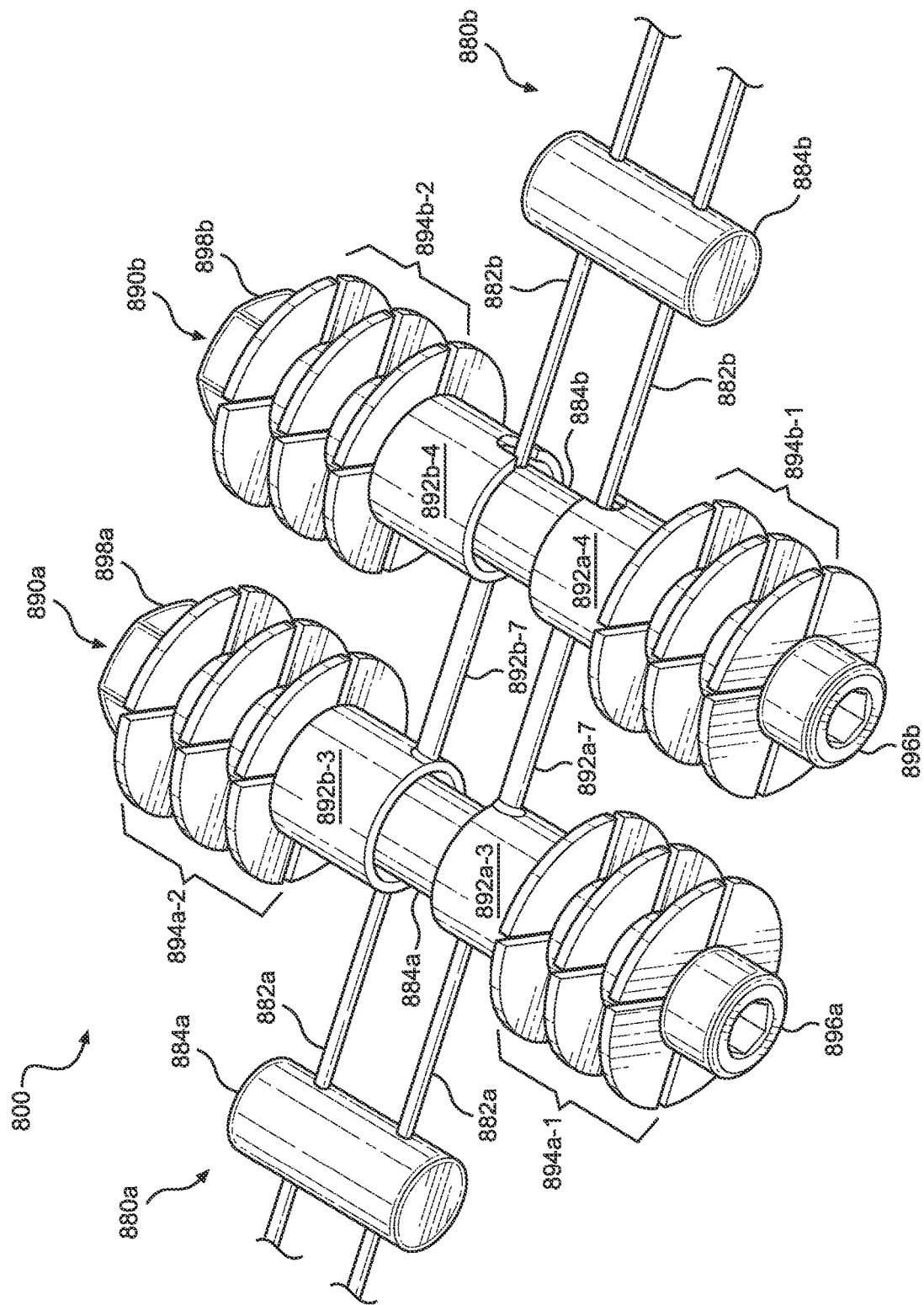

Turning now to FIG. 8A and FIG. 8B, perspective views of a belt-fed tube cleaning projectile system 800 according to some embodiments are shown. In some embodiments, the belt-fed tube cleaning projectile system 800 may comprise a plurality of projectile feed belts 880*a*-*b* comprising various belt segments 882*a*-*b*. According to some embodiments, the belt segments 882*a*-*b* may comprise and/or be coupled to a plurality of belt collars 884*a*-*b*. As depicted in FIG. 8A and FIG. 8B, for example, a first projectile feed belt 880*a* may comprise two parallel first projectile feed belt segments 882*a* coupled in between a first plurality of offset belt collars 884*a*. Similarly, in some embodiments, a second projectile feed belt 880*b* may comprise two parallel second projectile feed belt segments 882*b* coupled in between a second plurality of offset belt collars 884*b*. In some embodiments, each belt collar 884*a*-*b* may comprise and/or define a belt collar bore 884*a*-1, 884*b*-1. The belt collar bores 884*a*-1, 884*b*-1 (and/or the belt collars 884*a*-*b*) may be utilized, according to some embodiments, to couple various modular tube cleaning projectiles 890*a*-*b* to the respective projectile feed belts 880*a*-*b*.

In some embodiments, the modular tube cleaning projectiles 890*a*-*b* may be utilized to join or couple the two projectile feed belts 880*a*-*b*. As depicted, for example, the tube cleaning projectiles 890*a*-*b* may comprise body portions 892*a*-*b*. According to some embodiments, each body portion 892*a*-*b* may comprise a first body tube 892*a*-3, 892*b*-3 and/or a second body tube 892*a*-4, 892*b*-4, each body tube 892*a*-3, 892*b*-3, 892*a*-4, 892*b*-4 defining a respective body tube bore 892*a*-5, 892*b*-5, 892*a*-6, 892*b*-6. In some embodiments, each pair of first and second body tubes 892*a*-3, 892*a*-4 and 892*b*-3, 892*b*-4 may be connected together by a body connector 892*a*-7, 892*b*-7. According to some embodiments, each body tube 892*a*-3, 892*b*-3, 892*a*-4, 892*b*-4 may comprise a belt segment groove 892*a*-8, 892*b*-8, 892*a*-9, 892*b*-9. Each body tube 892*a*-3, 892*b*-3, 892*a*-4, 892*b*-4 may have a respective body tube bore 892*a*-5, 892*b*-5, 892*a*-6, 892*b*-6 sized to accept one of the belt collars 884*a*-*b*, for example, with the belt segment groove 892*a*-8, 892*b*-8, 892*a*-9, 892*b*-9 comprising notches or cutouts aligned to allow passage of the belt segments 882*a*-*b* in the case that the belt collars 884*a*-*b* are disposed within the respective body tube bores 892*a*-5, 892*b*-5, 892*a*-6, 892*b*-6.

According to some embodiments, each tube cleaning projectile 890*a*-*b* may comprise one or more sets of cleaning surfaces 894*a*-1, 894*a*-2, 894*b*-1, 894*b*-2 coupled together (and/or to the projectile feed belts 880*a*-*b*) via respective assembly bolts 896*a*-*b* (e.g., having respective assembly bolt heads 896*a*-1, 896*b*-1 and/or assembly bolt threads 896*a*-2, 896*b*-2) and assembly nuts 898*a*-*b*. As depicted in the assembly view of FIG. 8B, for example, a first assembly bolt 896*a* may be inserted (i) into a first cleaning surface unit 894*a*-1 of a first tube cleaning projectile 890*a*, (ii) into a first body tube bore 892*a*-5 of a first body tube 892*a*-3 of the first tube cleaning projectile 890*a*, (iii) through a first belt collar bore 884*a*-1 of a first belt collar 884*a* of a first projectile feed belt 880*a*, (iv) into a second body tube bore 892*b*-5 of a second body tube 892*b*-3 of the first tube cleaning projectile 890*a*, (v) through a second cleaning surface unit 894*a*-2 of the first tube cleaning projectile 890*a*, and (vi) be coupled, via first assembly bolt threads 896*a*-2 to a first assembly nut 898*a*. In some embodiments, a second assembly bolt 896*b* may be also or alternatively inserted (i) into a first cleaning surface unit 894*b*-1 of a second tube cleaning projectile 890*b*, (ii) into a second body tube bore 892*a*-6 of a second body tube 892*a*-4 of the second tube cleaning projectile 890*b*, (iii) through a second belt collar bore 884*b*-1 of a second belt collar 884*b* of a second projectile feed belt 880*b*, (iv) into a second body tube bore 892*b*-6 of a second body tube 892*b*-4 of the second tube cleaning projectile 890*b*, (v) through a second cleaning surface unit 894*b*-2 of the second tube cleaning projectile 890*b*, and (vi) be coupled, via second assembly bolt threads 896*b*-2 to a second assembly nut 898*b*. In such a manner, for example, individual tube cleaning projectiles 890*a*-*b* may be assembled on belt collars 884*a-b* of projectile feed belts 880*a-b* and/or sets (e.g., a pair, as depicted) of tube cleaning projectiles 890*a-b* may be assembled to join adjacent projectile feed belts 880*a-b*.

In some embodiments, any or all of the components 880*a-b*, 882*a-b*, 884*a-b*, 884*a*-1, 884*b*-1, 890*a-b*, 892*a-b*, 892*a*-3, 892*b*-3, 892*a*-4, 892*b*-4, 892*a*-5, 892*b*-5, 892*a*-6, 892*b*-6, 892*a*-7, 892*b*-7, 892*a*-8, 892*b*-8, 892*a*-9, 892*b*-9, 894*a*-1, 894*a*-2, 894*b*-1, 894*b*-2, 896*a-b*, 896*a*-1, 896*b*-1, 896*a*-2, 896*b*-2, 898*a-b* of the belt-fed tube cleaning projectile system 800 may be similar in configuration and/or functionality to any similarly named and/or numbered components described herein. Fewer or more components 880*a-b*, 882*a-b*, 884*a-b*, 884*a*-1, 884*b*-1, 890*a-b*, 892*a-b*, 892*a*-3, 892*b*-3, 892*a*-4, 892*b*-4, 892*a*-5, 892*b*-5, 892*a*-6, 892*b*-6, 892*a*-7, 892*b*-7, 892*a*-8, 892*b*-8, 892*a*-9, 892*b*-9, 894*a*-1, 894*a*-2, 894*b*-1, 894*b*-2, 896*a-b*, 896*a*-1, 896*b*-1, 896*a*-2, 896*b*-2, 898*a-b* (and/or portions thereof) and/or various configurations of the components 880*a-b*, 882*a-b*, 884*a-b*, 884*a*-1, 884*b*-1, 890*a-b*, 892*a-b*, 892*a*-3, 892*b*-3, 892*a*-4, 892*b*-4, 892*a*-5, 892*b*-5, 892*a*-6, 892*b*-6, 892*a*-7, 892*b*-7, 892*a*-8, 892*b*-8, 892*a*-9, 892*b*-9, 894*a*-1, 894*a*-2, 894*b*-1, 894*b*-2, 896*a-b*, 896*a*-1, 896*b*-1, 896*a*-2, 896*b*-2, 898*a-b* may be included in the belt-fed tube cleaning projectile system 800 without deviating from the scope of embodiments described herein. In some embodiments, one or more of the various components 880*a-b*, 882*a-b*, 884*a-b*, 884*a*-1, 884*b*-1, 890*a-b*, 892*a-b*, 892*a*-3, 892*b*-3, 892*a*-4, 892*b*-4, 892*a*-5, 892*b*-5, 892*a*-6, 892*b*-6, 892*a*-7, 892*b*-7, 892*a*-8, 892*b*-8, 892*a*-9, 892*b*-9, 894*a*-1, 894*a*-2, 894*b*-1, 894*b*-2, 896*a-b*, 896*a*-1, 896*b*-1, 896*a*-2, 896*b*-2, 898*a-b* may not be needed and/or desired in the belt-fed tube cleaning projectile system 800.

Figure 9:
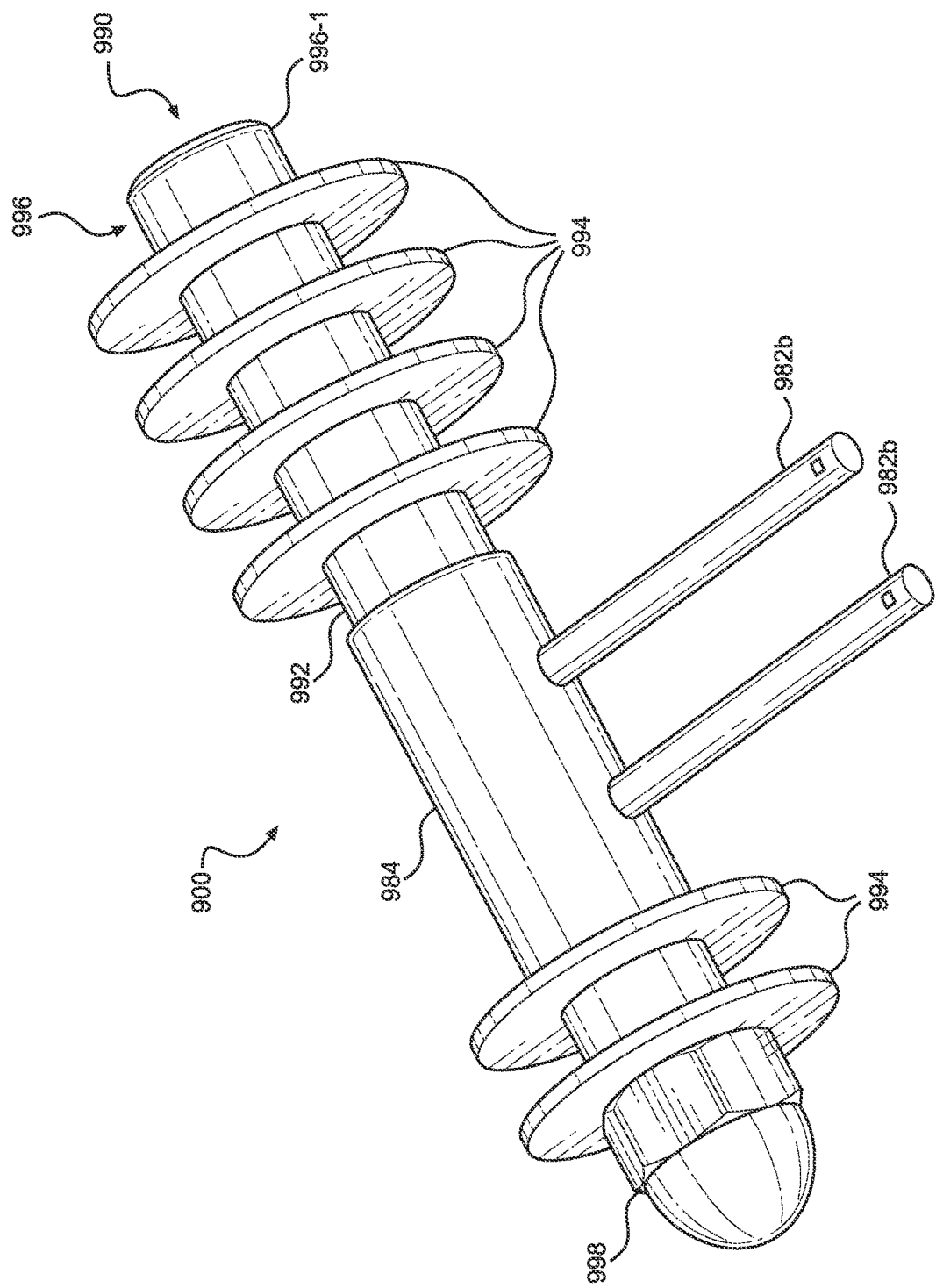
FIG. 9 is a perspective view of a belt-fed tube cleaning projectile system according to some embodiments.

Referring now to FIG. 9, a perspective view of a belt-fed tube cleaning projectile system 900 according to some embodiments is shown. In some embodiments, the belt-fed tube cleaning projectile system 900 may comprise a portion of a projectile feed belt such as the projectile feed belt 180 of FIG. 1 herein. According to some embodiments, the belt-fed tube cleaning projectile system 900 may comprise a plurality of belt segments 982*a-b* coupled to and/or emanating radially from a cylindrical belt collar 984. The belt collar 984 may, for example, be disposed on and/or coupled to a tube cleaning projectile 990. As depicted in FIG. 9, the belt collar 984 may comprise a hollow cylinder through which an elongate and/or axial body 992 of the tube cleaning projectile 990 is disposed. In some embodiments, the tube cleaning projectile 990 may comprise a plurality of tube cleaning surfaces 994 such as the disk-shaped radial protrusions depicted in FIG. 9.

According to some embodiments, the plurality of belt segments 982*a-b* may be coupled to the tube cleaning projectile 990 in various practicable manners. In some embodiments, the plurality of belt segments 982*a-b* may be coupled to belt segments of other projectiles (not shown in FIG. 9) to form a chain or belt of tube cleaning projectile 990. According to some embodiments for example, an assembly bolt 996 may be disposed through the tube cleaning surfaces 994 and through the belt collar 984 and secured together by an assembly nut 998. In such a manner, for example, different tube cleaning projectiles 990 comprising different quantities and/or configurations of tube cleaning surfaces 994 may be readily coupled to the belt collar 984 to form portions of a tube cleaning projectile feed belt to clean tubes, as described herein.

In some embodiments, any or all of the components 982*a-b*, 984, 990, 992, 994, 996, 996-1, 998 of the belt-fed tube cleaning projectile system 900 may be similar in configuration and/or functionality to any similarly named and/or numbered components described herein. Fewer or more components 982*a-b*, 984, 990, 992, 994, 996, 996-1, 998 (and/or portions thereof) and/or various configurations of the components 982*a-b*, 984, 990, 992, 994, 996, 996-1, 998 may be included in the belt-fed tube cleaning projectile system 900 without deviating from the scope of embodiments described herein. In some embodiments, one or more of the various components 982*a-b*, 984, 990, 992, 994, 996, 996-1, 998 may not be needed and/or desired in the belt-fed tube cleaning projectile system 900.

Figure 10:
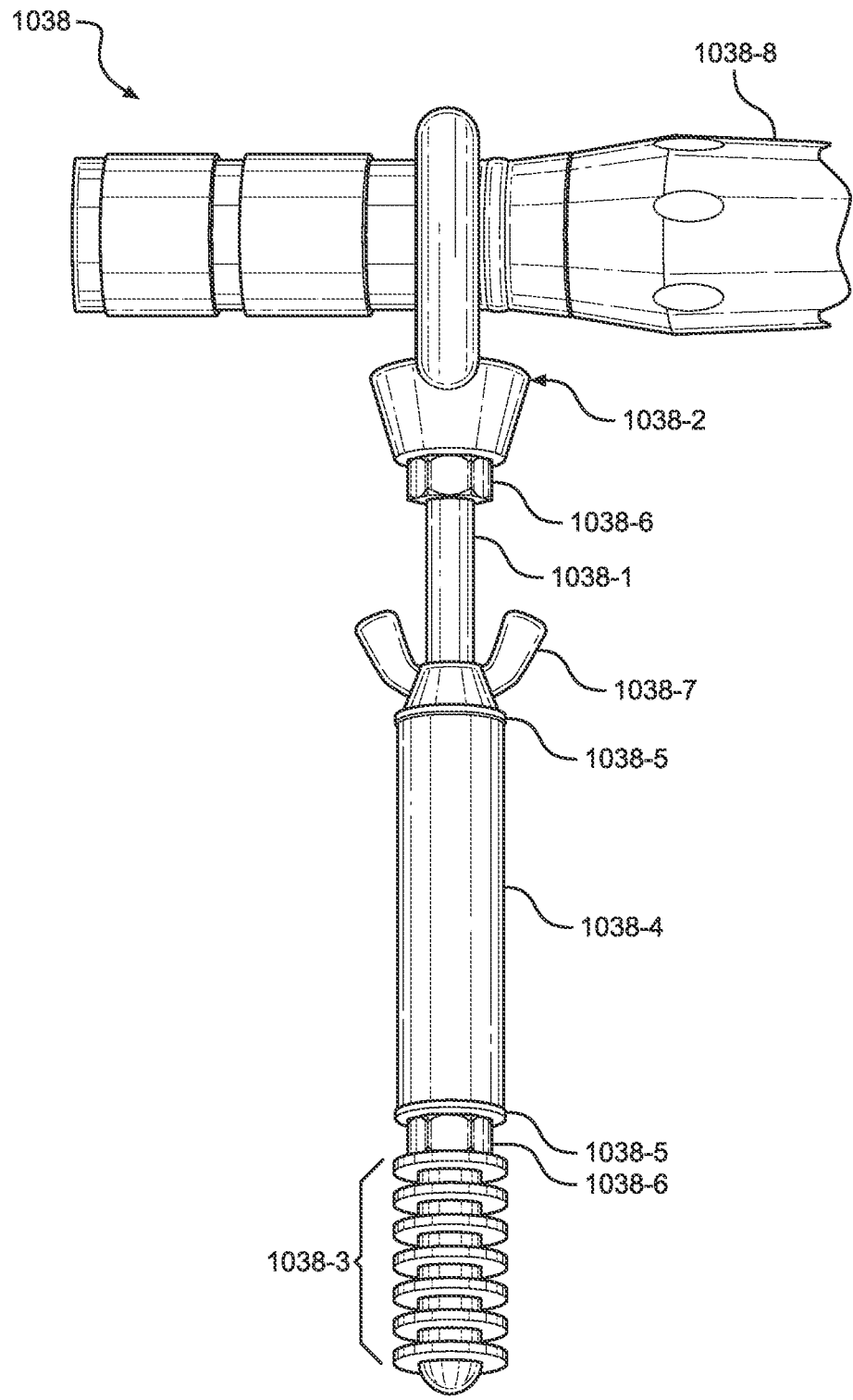
FIG. 10 is a side view of a tube cleaning marking mechanism according to some embodiments.

Turning now to FIG. 10, a side view of a tube cleaning marking mechanism 1038 according to some embodiments is shown. In some embodiments, the tube cleaning marking mechanism 1038 may be utilized to mark (e.g., with temporary or semi-permanent indicia such as light, paint, etc.) a tube array face (not shown in FIG. 10; such as the tube array face 174 of FIG. 1 herein), e.g., to indicate which tube(s) are being or have been cleaned. According to some embodiments, such as in the case that a tube array comprises linearly arranged rows of tube openings, the tube cleaning marking mechanism 1038 may be advantageously coupled to illuminate or otherwise mark a plurality of tubes and/or tube openings along a linear path on the tube array face.

In some embodiments, the tube cleaning marking mechanism 1038 may comprise a shaft 1038-1 coupled to or comprising an eye 1038-2 at a first end and coupled to or comprising a friction element 1038-3 at a second end. According to some embodiments, a spacer 1038-4 may be disposed on the shaft 1038-1 between the first and second ends thereof. In some embodiments, a plurality of washers 1038-5 and/or nuts 1038-6 may be disposed on and/or coupled to the shaft 1038-1, e.g., to secure the spacer 1038-4, eye 1038-2, and/or the friction element 1038-3 in place and/or allow for a length of the tube cleaning marking mechanism 1038 to be adjusted. In some embodiments, for example, a wingnut 1038-7 may be disposed between the spacer 1038-4 and the eye 1038-2 to facilitate hand adjustment of the tube cleaning marking mechanism 1038, such as may be desirable depending upon the characteristics and/or layout of the tube array as experienced in the field during cleaning operations. According to some embodiments, the eye 1038-2 may retain and/or be coupled to a marker 1038-8. In some embodiments, the marker 1038-8 may be coupled at a ninety-degree (90°) angle to an axis of the tube cleaning marking mechanism 1038 (e.g., as depicted). In the case that the marker 1038-8 comprises a light (such as a flashlight, as depicted), for example, the tube cleaning marking mechanism 1038 may be inserted into a tube via the second end thereof such that the friction element 1038-3 engages with the inside of the tube, producing a secure mounting for the tube cleaning marking mechanism 1038. In such a configuration, the marker 1038-8 may be disposed to illuminate a path along a plurality of linearly oriented tube openings. Such illumination may be advantageous by allowing the operator (not shown) to more readily identify tubes that have been cleaned or that remain to be cleaned, e.g., in an organized fashion to maximize tube cleaning efficiency.

III. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant(s) reserves the right to file additional applications to pursue patents for subject matter that has been disclosed and enabled, but not claimed in the present application.

What is claimed is:

1. A semi-automatic pneumatic tube cleaning projectile delivery system, comprising:
   a firing mechanism, comprising:
      a frame;
      a pneumatic delivery system coupled to the frame;
      an indexing system in communication with the pneumatic delivery system such that cycling of the pneumatic delivery system causes an activation of the indexing system; and
      a tube cleaning projectile cylinder defining a plurality of projectile chambers and comprising at least one cutting element, the tube cleaning projectile cylinder being coupled to the indexing system such that an activation of the indexing system causes an axial rotation of the tube cleaning projectile cylinder; and
   a delivery mechanism coupled to an outlet port of the firing mechanism, comprising:
      an inlet port coupled to receive a tube cleaning projectile from the outlet port of the firing mechanism;
      a nozzle coupled to discharge the tube cleaning projectile into a tube to be cleaned; and
      a trigger assembly coupled to selectively activate the firing mechanism to cause the pneumatic delivery system to cycle.

2. The semi-automatic pneumatic tube cleaning projectile delivery system of claim 1, wherein the
   tube cleaning projectile, comprises:
   (i) an axial body;
   (ii) at least one leading belt segment emanating radially outward, in a first direction, from the axial body;
   (iii) at least one trailing belt segment emanating radially outward, in a second direction, from the axial body;
   (iv) a tail segment at a first axial end of the axial body; and
   (v) a plurality of scraping surfaces disposed at a second axial end of the axial body.

3. The semi-automatic pneumatic tube cleaning projectile delivery system of claim 2, wherein the tube cleaning projectile further comprises:
   a first coupling feature comprising a first biased locking tab; and
   a first mating slot.

4. The semi-automatic pneumatic tube cleaning projectile delivery system of claim 3, wherein the tube cleaning projectile comprises a first tube cleaning projectile, further comprising:
   a second tube cleaning projectile comprising a second coupling feature comprising a second biased locking tab operable to mate with the first mating slot.

5. The semi-automatic pneumatic tube cleaning projectile delivery system of claim 3, wherein the tube cleaning projectile comprises a first tube cleaning projectile, further comprising:
   a second tube cleaning projectile comprising a second mating slot operable to mate with the first biased locking tab.

6. The semi-automatic pneumatic tube cleaning projectile delivery system of claim 3, wherein the first biased locking tab is disposed at a terminus of the at least one leading belt segment.

7. The semi-automatic pneumatic tube cleaning projectile delivery system of claim 6, wherein the first mating slot is disposed at a terminus of the at least one trailing belt segment.

8. The semi-automatic pneumatic tube cleaning projectile delivery system of claim 6, wherein the first mating slot is formed in a side of the axial body.

9. The semi-automatic pneumatic tube cleaning projectile delivery system of claim 2, wherein the first direction and the second direction comprise opposing directions.

10. The semi-automatic pneumatic tube cleaning projectile delivery system of claim 2, wherein the tail segment comprises a vented frustoconical cone.

11. The semi-automatic pneumatic tube cleaning projectile delivery system of claim 2, wherein the tail segment comprises a cup.

12. The semi-automatic pneumatic tube cleaning projectile delivery system of claim 2, wherein the tail segment comprises a plurality of fins.

13. A belt-fed tube cleaning system, comprising:
    a tube cleaning projectile feed belt comprising a plurality of tube cleaning projectiles connected via at least one belt segment;
    a belt-fed tube cleaning projectile firing mechanism, comprising:
       an action mechanism comprising an action chamber coupled to an outlet hose and being operable to discharge a at least one of plurality of tube cleaning projectiles into the outlet hose from the action chamber; and
       a belt-fed tube cleaning projectile cylinder coupled to (i) accept the tube cleaning projectile feed belt, (ii) comprising a cutting element disposed to sever the at least one belt segment between adjacent tube cleaning projectiles, and (iii) coupled to selectively deliver a single severed tube cleaning projectile from the tube cleaning projectile feed belt into the action chamber; and
    a belt-fed tube cleaning projectile delivery mechanism coupled to the belt-fed tube cleaning projectile firing mechanism by the outlet hose and, comprising;
       a trigger mechanism communicatively coupled to the belt-fed tube cleaning projectile firing mechanism and operable to provide an activation signal thereto; and
       a muzzle operable, upon an activation of the belt-fed tube cleaning projectile firing mechanism by the trigger mechanism, to deliver at least of one the plurality of the tube cleaning projectiles received via the outlet hose, into a tube.

14. The belt-fed tube cleaning system of claim 13, wherein at least one of the tube cleaning projectile, comprises:
    (i) an axial body;
    (ii) at least one leading belt segment emanating radially outward, in a first direction, from the axial body;
    (iii) at least one trailing belt segment emanating radially outward, in a second direction, from the axial body;
    (iv) a tail segment at a first axial end of the axial body; and
    (v) a plurality of scraping surfaces disposed at a second axial end of the axial body.

15. The belt-fed tube cleaning system of claim 14, wherein the at least one tube cleaning projectile further comprises:
    a first coupling feature comprising a first biased locking tab; and
    a first mating slot.

16. The belt-fed tube cleaning system of claim 15, wherein the at least one tube cleaning projectile comprises a first tube cleaning projectile, further comprising: a second tube cleaning projectile comprising a second coupling feature comprising a second biased locking tab operable to mate with the first mating slot.

17. The belt-fed tube cleaning system of claim 15, wherein the at least one tube cleaning projectile comprises a first tube cleaning projectile, further comprising: a second tube cleaning projectile comprising a second mating slot operable to mate with the first biased locking tab.

18. The belt-fed tube cleaning system of claim 15, wherein the first biased locking tab is disposed at a terminus of the at least one leading belt segment.

19. The belt-fed tube cleaning system of claim 18, wherein the first mating slot is disposed at a terminus of the at least one trailing belt segment.

20. The belt-fed tube cleaning system of claim 14, wherein at least one of: (i) the first direction and the second direction comprise opposing directions, (ii) the tail segment comprises a vented frustoconical cone, (iii) the tail segment comprises a cup, and (iv) the tail segment comprises a plurality of fins.

* * * * *